United States Patent
Palle Venkata et al.

(10) Patent No.: US 12,075,524 B2
(45) Date of Patent: Aug. 27, 2024

(54) USER EQUIPMENT CAPABILITY INFORMATION FOR CARRIER GROUPING IN DUAL CONNECTIVITY

(71) Applicant: Apple Inc., Cupertino, CA (US)

(72) Inventors: Naveen Kumar R. Palle Venkata, San Diego, CA (US); Fangli Xu, Beijing (CN); Dawei Zhang, Saratoga, CA (US); Haijing Hu, Los Gatos, CA (US); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 339 days.

(21) Appl. No.: 17/439,712

(22) PCT Filed: May 8, 2021

(86) PCT No.: PCT/CN2021/092460
§ 371 (c)(1),
(2) Date: Sep. 15, 2021

(87) PCT Pub. No.: WO2022/236494
PCT Pub. Date: Nov. 17, 2022

(65) Prior Publication Data
US 2022/0360974 A1 Nov. 10, 2022

(51) Int. Cl.
*H04W 8/24* (2009.01)
*H04W 88/06* (2009.01)

(52) U.S. Cl.
CPC .............. *H04W 8/24* (2013.01); *H04W 88/06* (2013.01)

(58) Field of Classification Search
None
See application file for complete search history.

(56) References Cited

U.S. PATENT DOCUMENTS

| 10,536,882 | B2 | 1/2020 | Kim et al. | |
|---|---|---|---|---|
| 2018/0343697 | A1* | 11/2018 | Hsu | H04W 76/16 |
| 2019/0045404 | A1* | 2/2019 | Tsai | H04W 36/0022 |
| 2020/0367085 | A1* | 11/2020 | Hong | H04L 5/001 |
| 2021/0037377 | A1 | 2/2021 | Jia et al. | |
| 2021/0360593 | A1* | 11/2021 | Hosseini | H04L 5/0053 |

FOREIGN PATENT DOCUMENTS

WO  2021026922  2/2021

OTHER PUBLICATIONS

UE Capabilities for Dual Connectivity, 3GPP TSG-RAN WG2 Meeting #87bis, R2-144560, Oct. 10, 2014, 2 pages.
(Continued)

*Primary Examiner* — Srinivasa R Reddivalam
(74) *Attorney, Agent, or Firm* — Kilpatrick Townsend & Stockton LLP

(57) ABSTRACT

The present application relates to devices and components including apparatus, systems, and methods to configure a UE for dual connectivity. In an example, a network node requests the UE to indicate the capability it supports for the dual connectivity. This request can implicitly or explicitly indicate that the UE should report carrier grouping information. In response, this information is sent by the UE, and the network node can configure an MCG and an SCG for the UE based on the reported carrier grouping information.

20 Claims, 15 Drawing Sheets

(56) References Cited

OTHER PUBLICATIONS

UE Capability for Dual Connectivity, 3GPP TSG RAN WG1 Meeting #78bis, R1-143799, Oct. 10, 2014, 3 pages.
International Patent Application No. PCT/CN2021/092460, International Search Report and Written Opinion, Mailed on Feb. 9, 2022, 8 pages.
3rd Generation Partnership Project; Technical Specification Group Radio Access Network; NR; Radio Resource Control (RRC) protocol specification (Release 16), 3GPP TS 38.331 V16.4.1, Mar. 2021, 949 pages.
3rd Generation Partnership Project; Technical Specification Group Radio Access Network; NR; User Equipment (UE) radio access capabilities (Release 16), 3GPP TS 38.306 V16.4.0, Mar. 2021, 151 pages.
"UE Capability for Dual Connectivity", Zhongxing Telecommunication Equipment, 3GPP TSG RAN WG1 Meeting #78bis, R1-143799, Oct. 6-10, 2014, 3 pages.
The European Application No. EP21941075.0, "Extended European Search Report," mailed Apr. 10, 2024, 13 pages.

* cited by examiner

USER EQUIPMENT CAPABILITY INFORMATION FOR CARRIER GROUPING IN DUAL CONNECTIVITY

CROSS-REFERENCES TO RELATED APPLICATIONS

This application is a U.S. National Stage Application of PCT/CN2021/092460 filed May 8, 2021. The disclosure of which is herein incorporated by reference in its entirety for all purposes.

Fifth generation mobile network (5G) is a wireless standard that aims to improve upon data transmission speed, reliability, availability, and more. This standard, while still developing, includes numerous details relating to cell reselection, where, for instance, a user equipment (UE) can communicate with a network using carriers in different frequency bands, where these frequency bands can belong to different frequency ranges.

DETAILED DESCRIPTION

Figure 1:
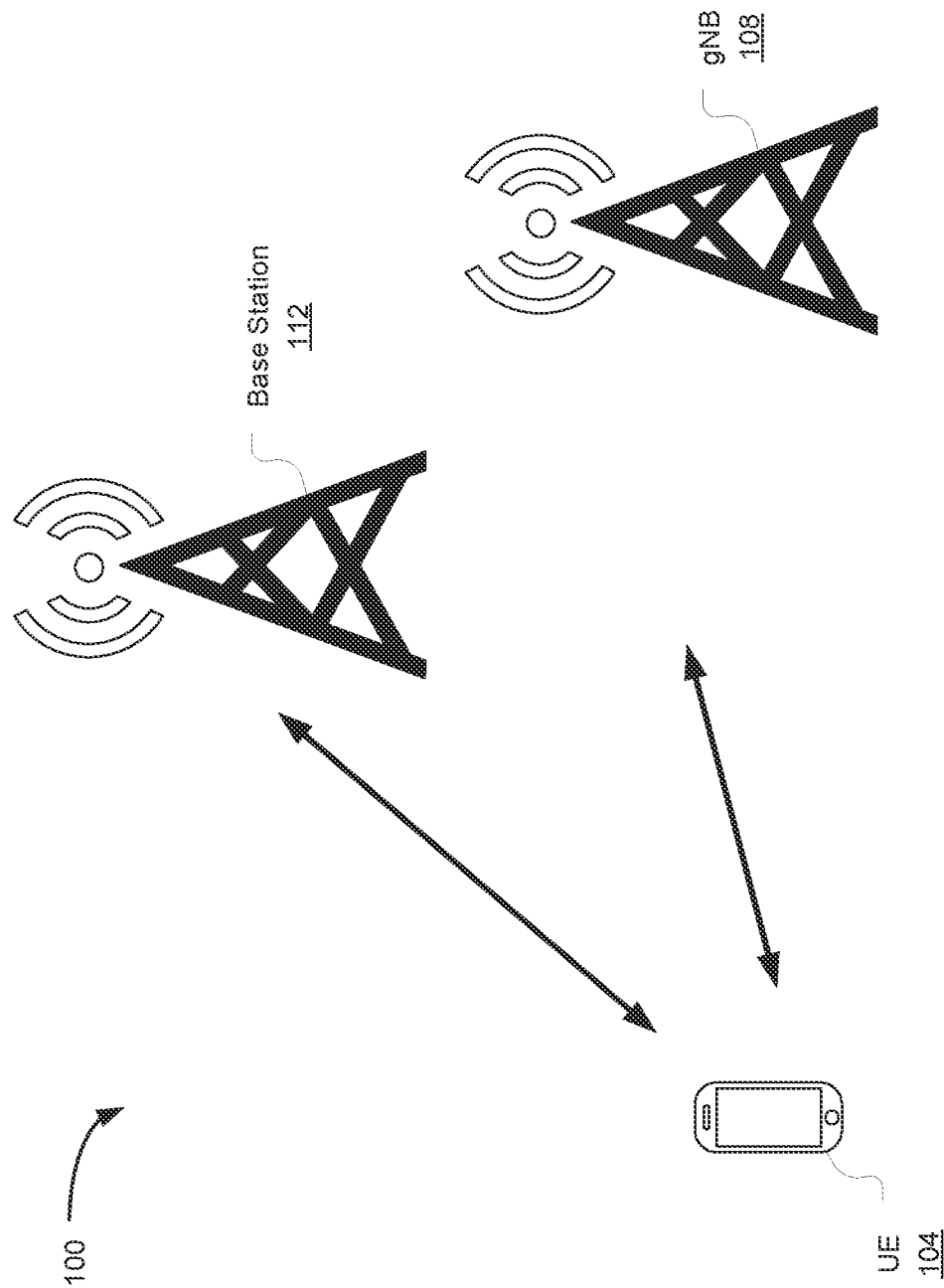
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) can communicate with a network, such as with one or more base stations or other network nodes, using carriers (also referred to as component carriers—CCs) in different bands (also referred to as frequency bands). The different bands can belong to different frequency ranges (FRs) including, for instance, frequency range 1 (FR1), between 450 megahertz (MHz) and 6000 megahertz (MHz), frequency range 2 (FR2), between 24.25 GHz and 52.6 GHz, and/or another frequency range starting at 52.6 GHz. The UE can support particular band combinations of such bands. The UE can also support dual connectivity, whereby the UE, by using bands from the band combinations, can communicate simultaneously with multiple network nodes, one of which may be a master node (which may be referred to also as a primary node) and another one may be a secondary node. A master cell group (MCG) (which may be referred to as a primary cell group) can be configured for the UE and provided by the master node and can include multiple carriers, each corresponding to a serving cell of the MCG. Similarly, a secondary cell group (SCG) can be configured for the UE and provided by the secondary node and can include multiple other carriers, each corresponding to a serving cell of the SCG.

To configure the MCG and SCG for the UE, information is exchanged between the UE and the network (e.g., the master node). The information can indicate whether the UE supports dual connectivity per band combination. For a band combination supported by the UE for dual connectivity, the information can further indicate whether the UE can support particular grouping of carriers from bands of the band combinations in a cell group(s) (e.g., the MCG, the SCG, or both the MCG and SCG).

In certain situations, the number of band combinations that the UE supports for dual connectivity may be large. Further, the number of potential groupings of carriers in cell groups per supported band combination may be large. As such, the amount of information exchanges between the UE and the network can be large too, thereby increasing the signaling overhead. To improve the signaling overhead (e.g., reduce the amount of information), the network (e.g., the master node) may be configured to indicate, to the UE, a request for the UE's carrier grouping capability for dual connectivity. If such a request is received, the UE can send its carrier grouping information.

Different variations to this approach can be independently or jointly implemented. In one example, the request may merely indicate that the network node does not support default carrier groupings (e.g., carriers in FR1 bands being grouped in a MCG and carriers in FR2 bands being grouped in an SCG). In another example, the request can indicate specific bands that the network deploys for dual connectivity. In yet another example, the request can further indicate whether each of such specific band is associated with a synchronous dual connectivity deployment or an asynchronous dual connectivity deployment.

Similarly, different granularities of the UE's capability information can be reported. In one example, the UE reports its full set of carrier grouping information (e.g., only in response to one of the above network node's requests). In another example, the UE includes information about only the carrier groups that the network is capable to configure. In yet another example, the UE can indicate a negative capability, such as the carrier groups that it does not support and that otherwise the network is capable to configure. In a further example, the UE can indicate a UE requirement and/or a UE constraint, such as the carriers from particular bands to be or not to be grouped together in a same cell group. These and other variations are further described herein below.

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or digital signal processors (DSPs) that are configured to provide the ed functionalitydescrib. In some embodiments, the circuitry may execute one or more software or firmware programs to provide at least some of the described functionality. The term "circuitry" may also refer to a combination of one or more hardware elements (a combination of circuits used in an electrical or electronic or system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network node of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like, as used herein, refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and MAC layers; the transport channels may transfer data between the MAC and PHY layers, and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer DCI that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1), frequency range 2 (FR2), and/or a higher frequency range (FRH). The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should apply a clear channel assessment (CCA) check before using the channel.

As further illustrated in FIG. 1, the network environment 100 may further include a base station 112 with which the UE 104 may also connect. The base station 112 supports the same RAT as the gNB 108 (e.g., the base station 112 is also a gNB). Additionally or alternatively, the base station 112 supports a different RAT (e.g., Long-Term Evolution (LTE) eNB).

In an example, the UE 104 supports carrier aggregation (CA), whereby the UE 104 can connect and exchange data simultaneously over multiple component carriers (CCs) with the gNB 108 or the base station 112. The CCs can belong to the same frequency band, in which case they are referred to as intra-band CCs. Intra-band CCs can be contiguous or non-contiguous. The CCs can also belong to different frequency bands, in which case they are referred to as inter-band CCs. A serving cell can be configured for the UE 104 to use a CC. A serving cell can be a primary (PCell) or a secondary cell (SCell). Multiple SCells can be activated via an SCell activation procedures where the component carriers of these serving cells can be intra-band contiguous, intra-band noon-contiguous, or inter-band. The serving cells can be collocated or non-collocated.

The UE 104 can also support dual connectivity (DC), where it can simultaneously transmit and receive data on multiple CCs from two serving nodes or cell groups (a master node (MN) and a secondary node (SN)). DC capability can be used with two serving nodes operating in the same RAT or in different RATs (e.g., an MN operating in NR, while an SN operates in LTE). These different DC modes include, for instance, evolved-universal terrestrial radio access-new radio (EN)-DC, NR-DC, and NE-DC (the MN is a NR gNB, and the SN is an LTE eNB).

Figure 2:
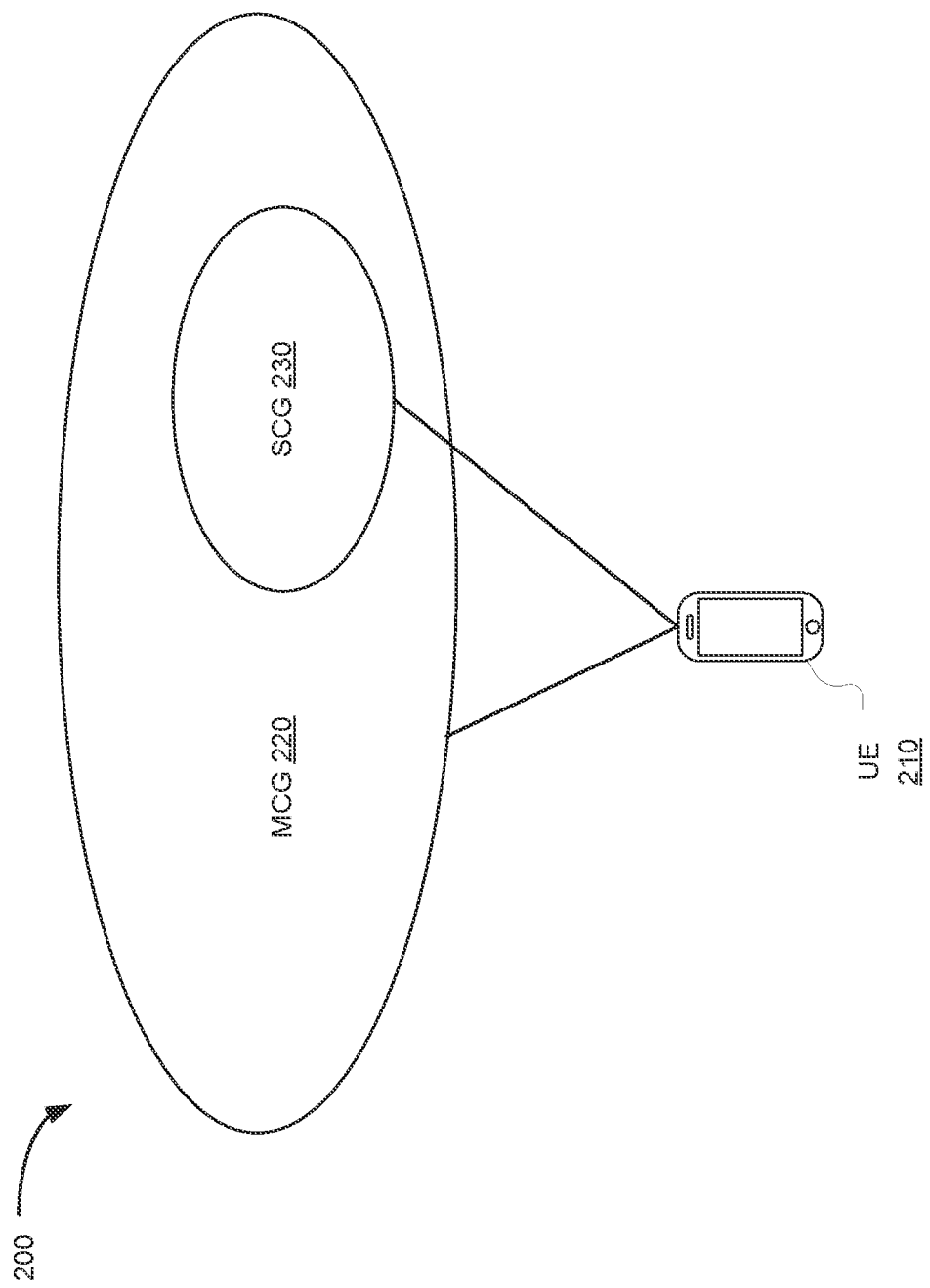
FIG. 2 illustrates an example of dual connectivity environment, in accordance with some embodiments.

FIG. 2 illustrates an example of dual connectivity environment 200, in accordance with some embodiments. Generally, dual connectivity (also referred to as DC) is an operational mode in which a UE 210 is configured to use radio resources of two network nodes, referred to as master node (MN) and a secondary node (SN), where these nodes are connected via a back-haul. The dual connectivity enables the UE 210 to simultaneously transmit and receive data on multiple carriers from two cell groups via the MN and the SN. In an example, each of the MN and SN can be a gNB or an eNB. The cell groups can be a master cell group (MCG) provided by the MN and a secondary cell group (SCG) provided by the SN.

In the illustration of FIG. 2, the UE 210, which is similar to the UE 104 of FIG. 1, maintains two connections, one with an MCG 220 and one with an SCG 230. The MCG 220 includes multiple carriers, each corresponding to a serving cell for the UE 210. The PCell is activated, whereas remaining serving cells of the MCG 220 may or may not be activated. Similarly, the SCG 230 includes multiple carriers, each corresponding to a serving cell for the UE 210. The primary cell in the SCG 230 (also referred to as primary secondary cell (PSCell) is activated, whereas remaining serving cells of the SCG 230 may or may not be activated. The UE 210 supports simultaneous reception and transmission over its two connections (also referred to as primary leg and secondary leg) with the MCG 220 and the SCG 230. A split-bearer situation can also be supported, whereby for small data amount, transmission via the primary leg may be sufficient. For large data amount, transmission via both legs can occur.

As indicated above, each of the MN and SN can be a gNB or an eNB. This can result in different deployment configurations for the MCG 220 and the SCG 230. These configurations include LTE-LTE DC, LTE-NR DC, NR-LTE DC, and NR-NR DC. Further, synchronous and asynchronous communications in the dual connectivity can be provided. With synchronous NR-DC, the MCG 220 and the SCG 230 are frame and slot-aligned (e.g., the serving cells in these two cell groups are synchronized). Conversely, with asynchronous NR-DC, the MCG 220 and the SCG 230 need not be frame and slot-aligned (e.g., the serving cells in these two cell groups need not be synchronized).

In an example, each of the MCG 220 and the SCG 230 includes a different set of carriers from the same or a different set of bands. This can result in intra-band DC, inter-band DC, and inter-band DC with intra-band components. In intra-band DC, carriers from the same band are present in the MCG 220 and the SCG 230. In comparison, in inter-band DC, carriers from different bans are present in the MCG 220 and the SCG 230. Inter-band DC with intra-band components can be a mix of intra-band DC and inter-band-DC, whereby carriers from different bands are present in the MCG 220 and the SCG 230 while a cell group (e.g., the MCG 220, the SCG 230, or both) include carriers from the same band.

To illustrate consider the following example. Generally. LTE bands are numbered with a band number (e.g., LTE-1_2 indicates carrier aggregation with "LTE band 1" and "LTE band 2"). The NR bands are similarly numbered, but an "n" is added as a pre-fix to a band number (e.g., DC-n1_n2 indicated dual connectivity with "NR band n1" and "NR band n2"). In this example, the MN is an eNB and the SN is a gNB and corresponds to an EN-DC deployment (E-UTRA-NR dual connectivity). DC-1_4_n1_n260 indicates that the EN-DC uses two LTE bands: "LTE band 1" and "LTE band 2," and two NR bands: "NR band n1" and "NR band n260"). This example corresponds to an inter-band EN-NR DC deployment. In another example, the deployment uses DC(n)1_n256 and corresponds to inter-band EN-NR DC with intra-band components. Here, the "LTE band 1" and the "NR band n1" are intra-band and the "NR band n1" and the "NR band 256" are inter-band.

In support of dual connectivity, the UE 210 reports its capability to support band combinations. A band combination corresponds to a set of two or more bands from the same frequency range or different frequency ranges (e.g., LTE and/or NR bands from FR1 and/or FR2 (as applicable)). For instance, a band combination is denoted as "n1,n2,n3" and corresponds to a combinations of three NR bands from FR1: "NR band nb1." "NR band n2," and "NR band n3."

For each band combination, the UE 210 reports whether the UE 210 supports the band combination for dual connectivity. In other words, the UE 210 can indicate whether carriers in the bands of the band combinations can be supported by the UE 210 for the dual connectivity. For instance, the UE 210 reports to the network (e.g., the MN) UE capability information indicating that it supports the band combination "n1,n2,n3" for dual connectivity. In this case, the network can configure carriers (e.g., serving cells) from the corresponding NR bands (e.g., "NR band n1," "NR band n2," and "NR band n3") for dual connectivity of the UE 210.

In an example, in addition or alternative to indicating support of band combinations for dual connectivity, the UE 210 can indicate its supports of groupings of carriers between the MCG 220 and the SCG 230 by sending carrier grouping information. Carriers from a grouping of carriers (also referred to as a carrier grouping) are from bands that the UE 210 for a band combination in dual connectivity. The UE 210 indicates how these carriers can be grouped in the MCG 220 and the SCG 230. The carrier grouping information need not identify the carriers. Instead, the carrier grouping information can indicate the bands of the band combinations and how a first subset of these bands can be associated with the MCG 220 and a second subset of these bands can be associated with the SCG 230. The network can then configure carriers (e.g., serving cells) in the bands from the first subset to belong to the MCG 220, and carriers (e.g., serving cells) in the bands from the second subset to belong to the SCG 230. To illustrate, and continuing with the band combination "n1,n2,n3" example, the carrier grouping information can indicate that the UE supports one or more carriers in the "NR band n1" and "NR band n2," being grouped in the MCG 220 and one or more carriers in "NR band n3" being grouped in the SCG 230. As such, the network can configure the MCG 220 to include one or more carriers "NR band n1" and/or "NR band n2," and the SCG 230 to include one or more carriers in "NR band n3."

If no such carrier grouping information is reported, the network can assume a default carrier grouping. For example, the default can be that, for a supported band combinations, carriers from its FR1 bands can be grouped in the MCG 220, whereas carriers from its FR2 bands can be grouped in the SCG 230. This type of reporting and/or default assumption, can be used for each of the band combinations that the UE supports for dual connectivity.

Figure 3:
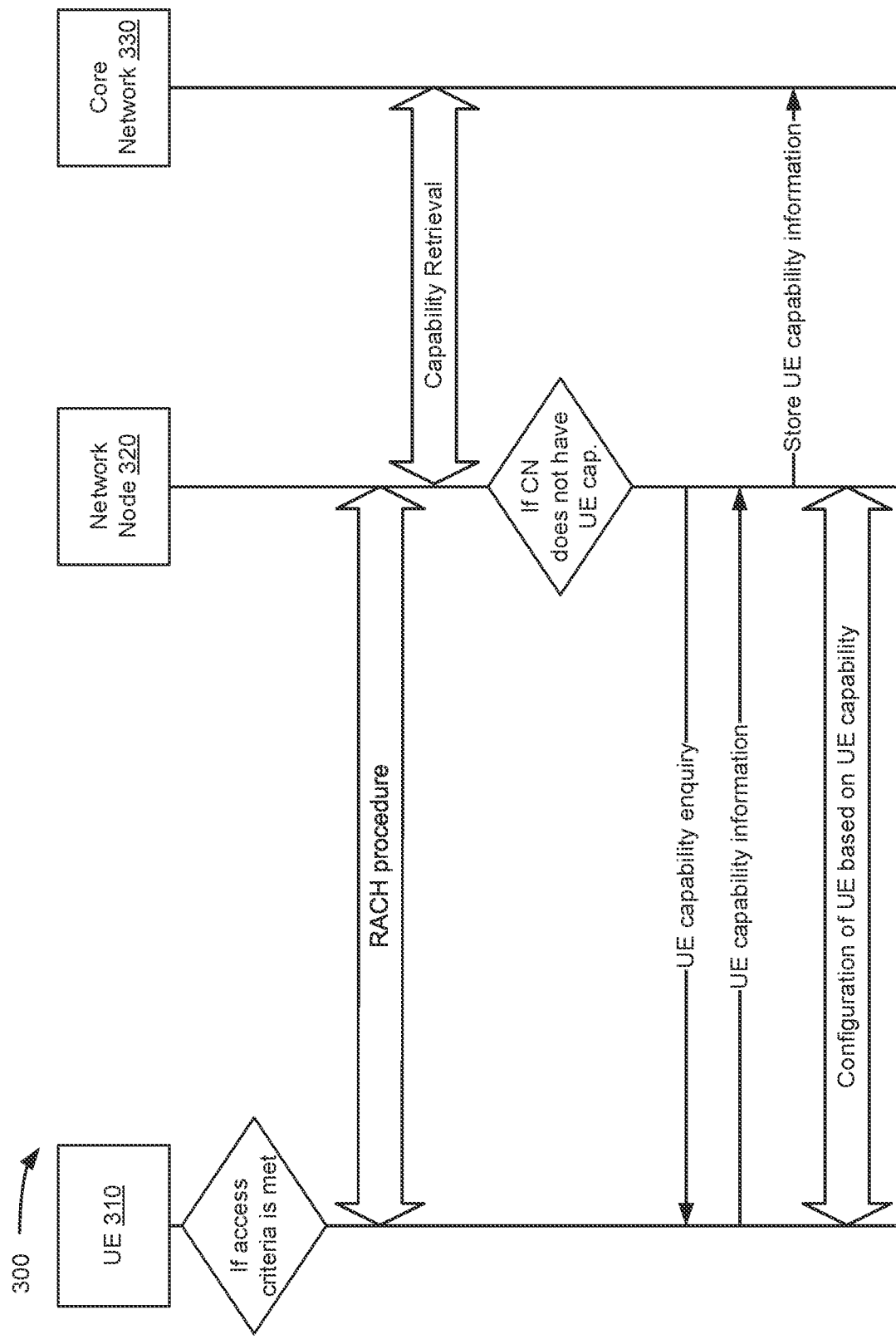
FIG. 3 illustrates an example of a sequence diagram showing signaling between a user equipment (UE) and a network node for band combinations, in accordance with some embodiments.

FIG. 3 illustrates an example of a sequence diagram 300 showing signaling between a UE 310 and a network node 320 for band combinations, in accordance with some embodiments. Generally, the sequence diagram 300 can be used to configuring the UE 310 for dual connectivity, as applicable, based on the UE's 310 capabilities associated with the dual connectivity.

As illustrated, the sequence diagram 300 includes starting a capability transfer procedure during a registration of the UE 310 with a network via a network node 320 of the network. This procedure can be initiated about the UE 310 determining that one or more access criteria are satisfied. These criteria can relate to cell measurements, handover procedures, cell resections, network roaming, and/or other procedures for registering the UE 310 with the network. The capability transfer procedure includes a random access (RACH) procedure for the UE 310 to create an initial connection with the network. For example, a system information block (SIB) is sent from the network node 320. In response, the UE 310 initiates a new session with a randomly selected preamble. The network node 320 responds with a random access response message. In turn, the UE 310 sends an RRC Connection Request message and the network node 320 responds with an RRC Connection Setup message. Next, the UE 310 sends an RRC Connection Setup message in which it can indicate that the UE 310 supports dual connectivity.

Because dual connectivity is supported, the network node 320 checks with the network, such as by querying a core network 330 of the network, whether UE capability information of the UE 310 for the dual connectivity is available (e.g., previously stored by the core network 330). This capability check is shown in FIG. 3 as a capability retrieval. If unavailable, RRC signaling can be exchanged between the network 320 and the UE 310 to determine the UE capability information, including the UE's support of band combinations for dual connectivity. The RRC signaling of the network node 320 can include a UE capability enquiry, which can have multiple information element (IEs) and can be sent in an RRC request message to the UE 310. In response, the UE 310 sends its UE capability information, which can also have multiple IEs and can be sent in an RRC response message. The Network node 320 passes this information to the core network 330 for storage thereat. Otherwise, the network node 320 need not receive the UE capability information 310 from the UE 310 and can, instead, use the retrieved information from the core network 330.

Once the UE capability information is determined (e.g., from the UE 310 or from the core network 330), the network node 320 can configure various resources to the UE 310 based on the UE capability information. This can include activating a default radio bearer, configuring measurement objects, sending reference signals, and the like. In addition, for dual connectivity, this can also include configuring an MCG and an SCG for the UE. This configuration can rely on RRC signaling that includes, for instance, one or more RRC Connection Reconfiguration message(s). For example, the network node 320 can allocate carriers (e.g., serving cells) of the MCG and can send a node addition request to a second node of the network for adding the second node as an SN (in which case the network node 320 is an MN). This SN can allocate carriers (e.g., serving cells) of the SCG and can respond to the network node 320 with a node addition request acknowledgment indicating the serving cells of the SCG (e.g., the various resources). Next, the network node 320 can send one or more RRC Connection Reconfiguration messages to the UE 310 indicating the resources of the MCG and of the SCG.

As described herein above, the UE 310 can support one or more band combinations for the dual connectivity. Further, the UE 310 can be preset to support particular carrier grouping per band combination. This present can depend, for instance, on the radio frequency (RF) hardware of the UE 310. Further, the UE 310 can receiver over-the-air (OTA) updates of a service provider (e.g., of a mobile network operator) for disabling some bands.

Accordingly, the UE 310 may maintain an internal data structure (e.g., a table) that shows, per band combinations, different variants. Each variant indicates how carriers in bands of the band combination, when these carriers are allocated by the network node 320, can be grouped together in the MCG and the SCG configured by the network node 320 for the UE 310.

To illustrate this data structure, consider an example of a band combination: n2A_n5A_n256A_n260_n260. This band combination is an NR band combination of four NR bands, one of which is repeated twice to indicate that contiguous and non-contiguous carriers can be allocated from such NR band. In particular, the NR bands are "NR band n2A," "NR band n5A," "NR band n256," and "NR band n260" repeated twice. The UE 310 can maintain the below data structure (illustrated as a table, although other types of data structures are possible, such as a string, and array, and the like).

TABLE 1

| Variant index | MCG | SCG |
|---|---|---|
| 1 | n2A | n5A_n256A_n260A_n260A |
| 2 | n5A | 22A_n256A_n260A_n260A |
| 3 | N256A | n2A_n5A_n260A_n260A |
| 4 | N260A | n2A_n5A_n256A_n260A |
| 5 | n2A_n5A | n256A_n260A_n260A |
| 6 | n2A_n256A | n5A_n260A_n260A |
| 7 | n2A_n260A | n5A_n256A_n260A |
| ... | ... | ... |

In the above table, "variant 1" indicates that the UE 310 supports one or more carriers from the "NR band 2A" being allocated to the MCG, and that the UE 310 supports one or more carriers from each of the "NR band 5A," "NR and 256A," and "NR band 260A" being allocated to the SCG. Each of the remaining variants indicates that the UE 310 supports a different set of allocations to the MCG and SCG (e.g., each set representing a carrier grouping). When the default MCG-SCG allocation is carriers from FR1 bands are to be grouped in the MCG and carriers from the FR2 bands are to be grouped in the SCG (e.g., the configuration to be used by the network node 320 when the UE 310 does not provide its carrier grouping information), "variant 5" indicates that the UE 310 supports this default (because the "NR band 2A" and the "NR band 5A" are FR1 bands and would have a carrier grouping in the MCG, whereas "NR band 256A" and the "NR band 260A" are FR2 bands and would have a carrier grouping in the SCG).

The above carrier grouping information can be maintained in the data structure for each band combination that the UE 310 supports for the dual connectivity. The size of the data structure (e.g., the amount of the carrier grouping information) can be large. That is because the number of permutations (e.g., the number of possible variants) in which the different carriers can be grouped can be large. In a rough sense, for a band combination of "n" different carriers (where each carrier is from a different band), the number of ways the carriers can be grouped into the MCG and the SCG is about $n!/(1!\times 2!)$. In the above illustration of the band combination of five bands, this number is sixty possible carrier groupings in the MCG and SCG (e.g., sixty variants). This number can increase when the intra-contiguous and non-contiguous variants are considered.

If the UE 310 were to report the carrier grouping information (e.g., information about the variants) for each of the band combinations that it supports for dual connectivity, the amount of reported information can be large. In other words, the overhead signaling can be large.

Various approaches to reduce this overhead can be used and are further described in connection with the next figures. At the lowest level of granularity, the UE 310 can report the full set of carrier grouping information only if requested by the network node 310. At the highest level of granularity, the UE 310 can report a subset of the carrier grouping information, where this subset is specific to band combination deployment(s) for dual connectivity by the network. The granularity level at which the carrier grouping information is reported by the UE 310 can depend on the network node's 320 request. The more parameters this request has, the higher the granularity level becomes. In particular, the UE 310 can use the parameter(s) from the request as a filter to look up the data structure, determine matches, and reported the matched information to the network node 320. For instance, the UE 310 can store logic for a querying engine that uses the parameters in a query. The parameters can include any or all of the following: whether the network node 320 (or more generally the network) supports default MCG-SCG allocation only, whether the network node 320 or more generally the network) supports a non-default MCG-SCG allocation, the bands that the network node 320 (or more generally the network) supports for band combinations in the dual connectivity, the bands that the network node 320 (or more generally the network) does not support for band combinations in the dual connectivity, the band combinations that the network node 320 (or more generally the network) supports for the dual connectivity, the band combinations that the network node 320 (or more generally the network) does not support in the dual connectivity, the set of bands that the network node 320 (or more generally the network) supports for synchronous deployment of the dual connectivity, the set of bands that the network node 320 (or more generally the network) supports for asynchronous deployment of the dual connectivity, and/or other parameters related to how the network node 320 (or more generally the network) can deploy the dual connectivity, band combinations in the dual connectivity, bands in the band combinations, and/or carriers in the bands.

Figure 4:
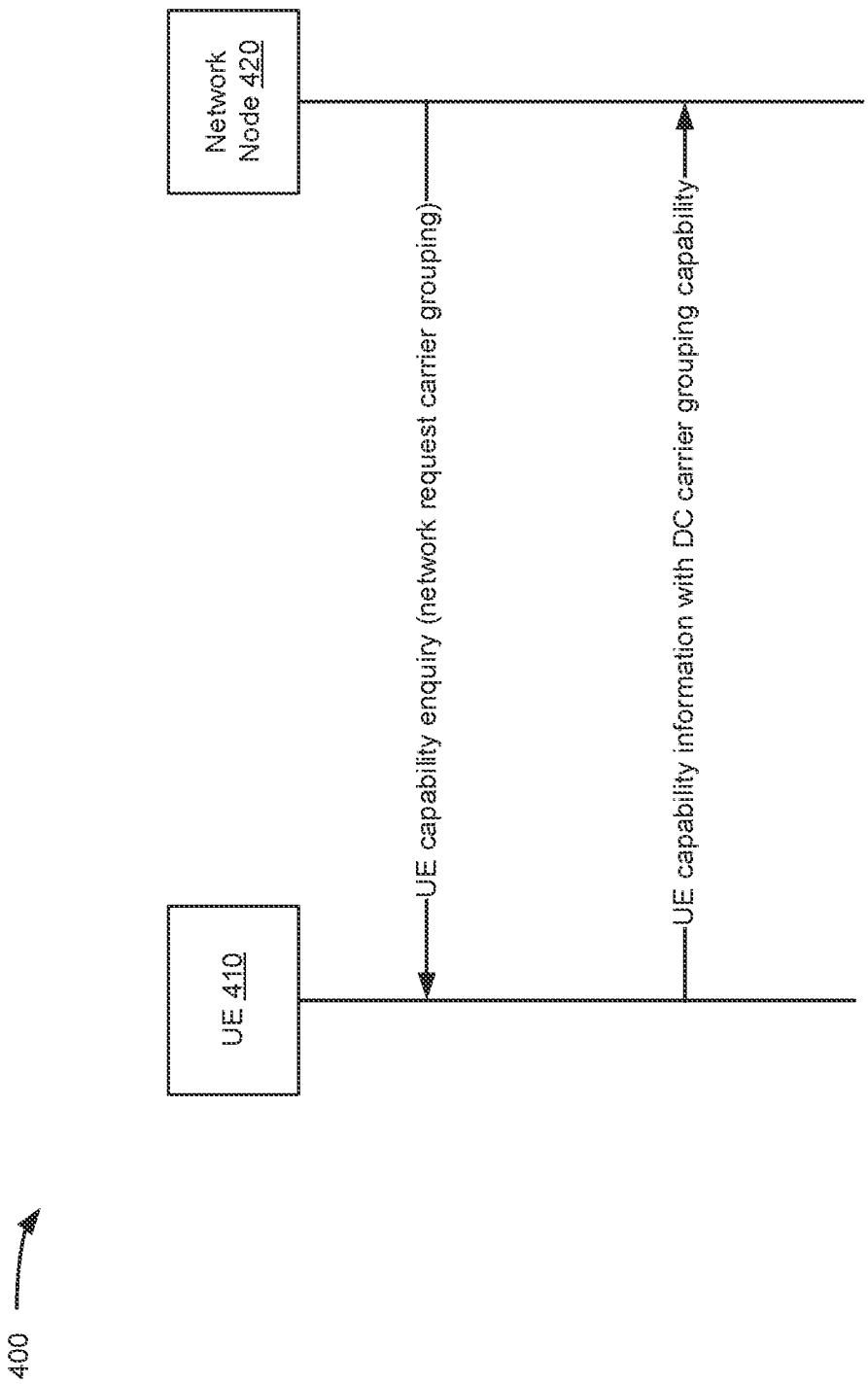
FIG. 4 illustrates an example of a sequence diagram showing signaling between a UE and a network node for enquiring about a UE capability for carrier grouping, in accordance with some embodiments.

FIG. 4 illustrates an example of a sequence diagram 400 showing signaling between a UE 410 and a network node 420 for enquiring about a UE capability for carrier grouping, in accordance with some embodiments. In an example, the signaling is RRC signaling that is exchanged as part of the capability transfer procedure during registration, described in connection with FIG. 3. The UE 410 and the network node 420 are examples of the UE 310 and the network node 320, respectively, of FIG. 3. In this sequence diagram 400, the network node 420 may merely indicate that it supports a non-default MCG-SCG allocation. Only in response to this indication does the UE 410 sends its carrier grouping information. In other words, when the network node 420 does not provide additional information beyond its supports of the non-default MCG-SCG allocation, the UE 410 indicates its full set of variants to the network node 420.

As such, the sequence diagram 400 is an example of an approach that ensures that the UE 410 does not have to report the carrier grouping for each band combination, if the network does not intend to configure dual connectivity to the UE 410. It could be that the network actually does not support a dual connectivity configuration, in which case the UE reporting all of its carrier grouping information is not useful. In this case, the UE 410 reports the carrier grouping information only when network explicitly requests the UE 410 to report it (assuming that the network actually supports the different carrier groupings other than the default MCG-SCG allocation that does not necessitate the UE to signal any carrier grouping information).

In an example, the sequence diagram 400 includes the network node 420 sending a UE capability enquiry to the UE 410 and the UE 410 responding with UE capability information. The UE capability enquiry is associated with the UE's 410 support of carrier grouping for dual connectivity. In one illustration, the UE capability enquiry indicates that the network node 420 supports grouping a plurality of carriers from different frequency ranges in a same cell group. For instance, this enquiry merely indicates that the network node 420 supports a non-default MCG-SCG allocation (or, conversely, does not support the default MCG-SCG allocation). In another illustration, the UE capability enquiry can include a request indicating to the UE 410 that its full set of carrier grouping information should be reported. As such, in the UE capability information, the UE can indicate its supported band combinations (e.g., for CA). For each supported band combination, the UE capability information can also indicate whether the UE 410 supports using this band combination for the dual connectivity. If usable, the UE capability information can indicate the corresponding portion of the carrier grouping information (e.g., the full set of variants for that band combination supported by the UE 410 for the dual connectivity). For instance, the UE capability information indicates bands that form a supported band combination and that are in different frequency ranges, and that the UE 410 supports the carriers from the different frequency ranges being grouped in the same cell group. Additional granularity can be provided, whereby the carrier grouping information indicates that the UE supports a first carrier in a first band of the bands being grouped in the MCG and a second carrier in a second band of the bands being grouped in the SCG.

To illustrate, consider the following example. In response to the UE capability enquiry, the UE 410 reports that it supports the band combination "n5,n6" for CA but not DC and the band combination "n1,n3,n4" for DC (and CA). Because the band combination "n5,n6" is not supported for DC, the UE 410 does not report carrier grouping information for this band combination. In comparison, because the band combination "n1,n3,n4" is supported for DC, the UE 410 reports its grouping information for this band combination. Assume in this case that the UE 410 supports two variants.

The first variant is "NR band n1" being allocated to an MCG (e.g., one or more carriers therefrom being configured as corresponding serving cell(s) in the MCG) and "NR band n3" and "NR band n4" being allocated to an SCG (e.g., one or more carriers therefrom being configured as corresponding serving cell(s) in the SCG). The second variant is "NR band n1" and "NR band n4" being allocated to the MCG and "NR band 3" allocated to the SCG. In this illustration, the UE 410 reports the first variant and the second variant to the network node 420. Similar carrier configuration information for other UE-supported band combinations for dual connectivity can be reported to the network node 420.

In response, the network node 420 can store the UE capability information (including the reported carrier aggregation information) in the network (e.g., at a core network). The network node 420 can also configure the MCG and the SCG for the UE 410 based on the reported carrier aggregation information. For instance, the network node 420 may use the first variant to configure a set of carriers in the "NR band n1" as a set of serving cells in the MCG and a set of carriers in the "NR band n3" and/or "NR band n4" as a set of serving cells in the SCG.

Figure 5:
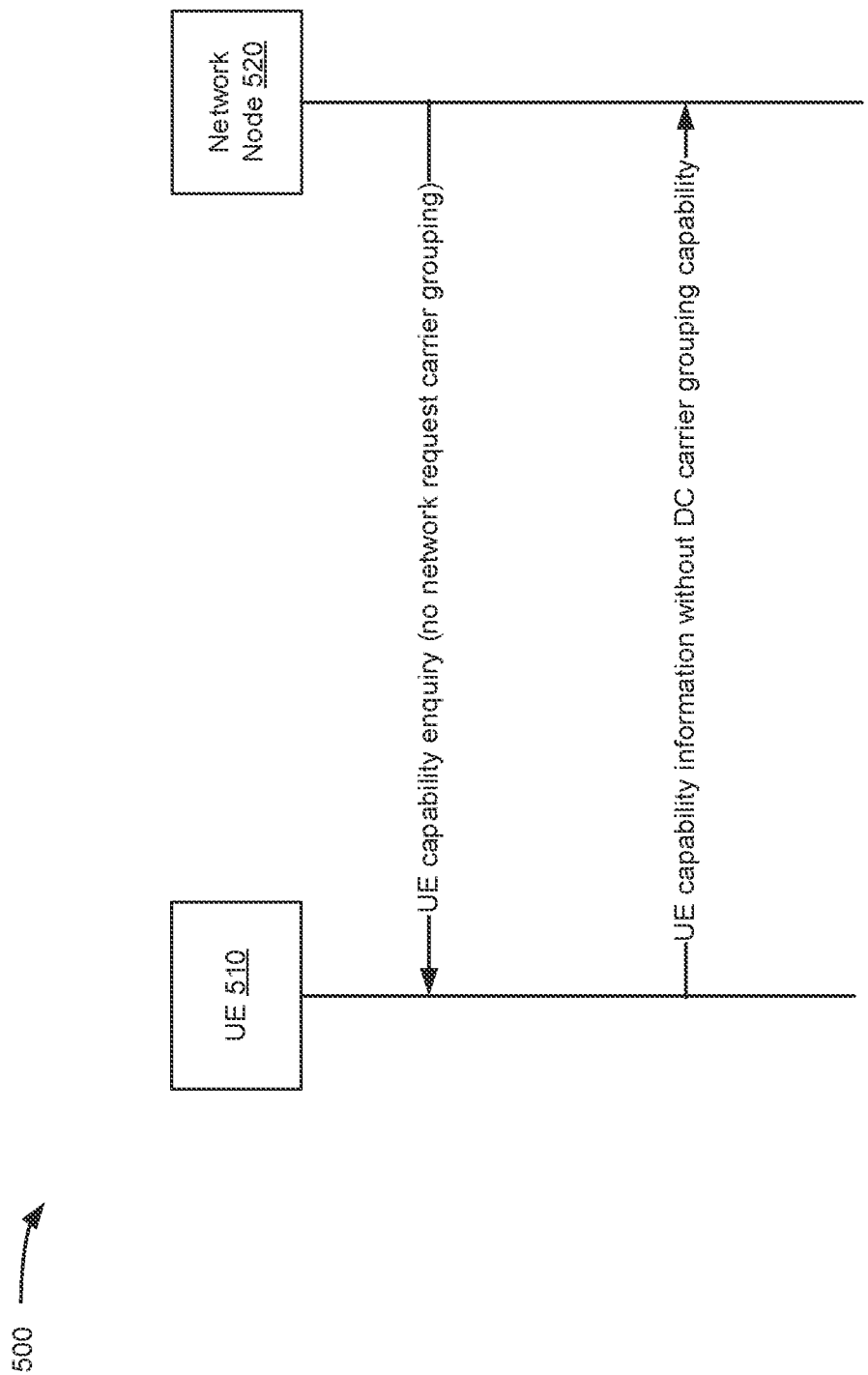
FIG. 5 illustrates another example of a sequence diagram showing signaling between a UE and a network node for enquiring about a UE capability for carrier grouping, in accordance with some embodiments.

FIG. 5 illustrates another example of a sequence diagram 500 showing signaling between a UE 510 and a network node 520 for enquiring about a UE capability for carrier grouping, in accordance with some embodiments. In an example, the signaling is RRC signaling that is exchanged as part of the capability transfer procedure during registration, described in connection with FIG. 3. The UE 510 and the network node 520 are examples of the UE 310 and the network node 320, respectively, of FIG. 3. The sequence diagram 500 is complementary to the sequence diagram 400 (here, the network node 520 is different from the network node 420 of FIG. 4, where each of such nodes can belong to a different network). In particular, if the network node 520 does not request the UE 510 to send its carrier grouping information, the UE 510 can indicate its support of band combinations for dual connectivity without reporting its carrier grouping information.

As such, the sequence diagram 500 is another example of an approach that ensures that the UE 510 does not have to report the carrier grouping for each band combination, if the network does not intend to configure dual connectivity to the UE 410. For instance, if the UE 510 roams into a network that does not support dual connectivity or non-default MCG-SCG allocation (and so the network node 520 does not ask for the carrier grouping information), the UE 510 just reports its UE capability information without the carrier grouping information, therefore saving the UE capability size by keeping the information in the UE capability IE(s) relevant.

In an example, the sequence diagram 500 includes the network node 520 sending a UE capability enquiry to the UE 510 and the UE 510 responding with UE capability information. The UE capability enquiry associated with the UE's 510 support of the dual connectivity but not the carrier grouping for the dual connectivity. In one illustration, the UE capability enquiry indicates that the network node 520 does not support a non-default MCG-SCG allocation (or, conversely, supports only the default MCG-SCG allocation). In another illustration, the UE capability enquiry exclude any request indicating to the UE 510 that its full set of carrier grouping information should be reported. As such, in the UE capability information, the UE can indicate its supported band combinations (e.g., for CA). For each supported band combination, the UE capability information can also indicate whether the UE 510 supports using this band combination for the dual connectivity. However, for such band combinations, the UE does not include the corresponding portion of the carrier grouping information (e.g., the full set of variants for that band combination supported by the UE 510 for the dual connectivity).

To illustrate, consider the following example. In response to the UE capability enquiry, the UE 510 reports that it supports the band combination "n1,n2" for CA but not DC and the band combination "n1,n3,n4" for DC (and CA). Because the band combination "n1,n2" is not supported for DC, the UE 510 does not report carrier grouping information for this band combination. Further, although the band combination "n1,n3,n4" is supported for DC, the UE 510 still does not report its grouping information for this band combination because the UE capability enquiry did not request this information.

In response, the network node 520 can store the UE capability information (but not the reported carrier aggregation information because it was not reported) in the network (e.g., at a core network). The network node 520 does not configure an MCG or an SCG for the UE 510.

Figure 6:
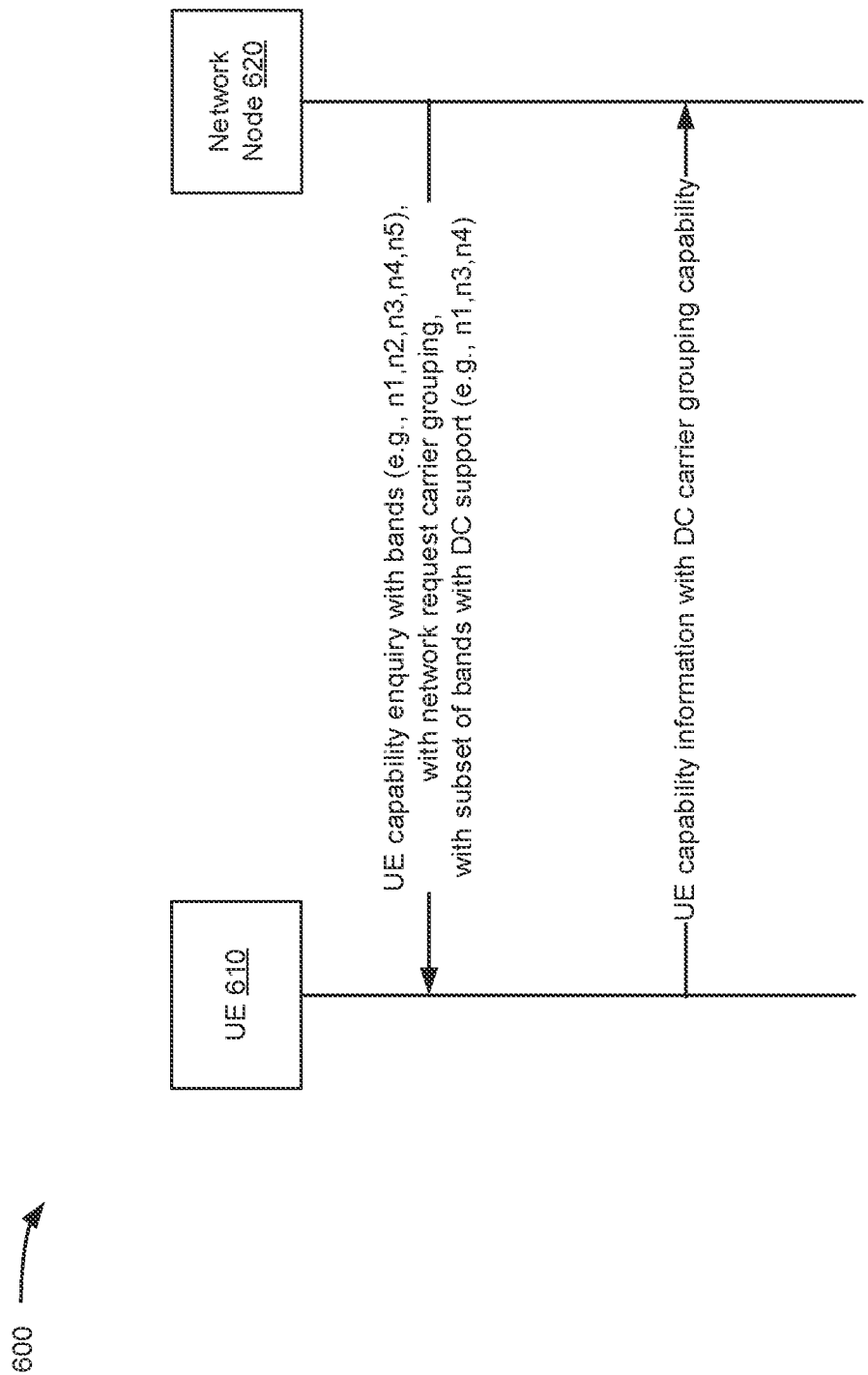
FIG. 6 illustrates yet another example of a sequence diagram showing signaling between a UE and a network node for enquiring about a UE capability for carrier grouping, in accordance with some embodiments.

FIG. 6 illustrates yet another example of a sequence diagram 600 showing signaling between a UE 610 and a network node 620 for enquiring about a UE capability for carrier grouping, in accordance with some embodiments. In an example, the signaling is RRC signaling that is exchanged as part of the capability transfer procedure during registration, described in connection with FIG. 3. The UE 610 and the network node 620 are examples of the UE 310 and the network node 320, respectively, of FIG. 3. Relative to the sequence diagram 400, the information exchange is more granular here. In this sequence diagram 600, the network node 620 may indicate sets of bands that the network node 620 (or more generally the network) supports for dual connectivity. In response to this indication, the UE 610 sends its carrier grouping information. Here, like the sequence diagram 400 of FIG. 4, the carrier grouping information can be the full set of variants that the UE 610 supports. Alternatively, the UE 610 can use the indicators of the bands as filters in a look-up of its data structure to then report only the portion of the configuration information that corresponds to the indicated bands.

As such, the sequence diagram 600 is an example of an approach, where while CA is possible at the network, due to a number of factors (e.g., the presence of MCG and SCG and the inter-node coordination), only certain bands that are used in a cell group (e.g., SCG are) useful for the actual deployment of dual connectivity by the network. In comparison, CA may be possible with more bands/carriers. In this case, the network provides the bands that the network intends to use for the dual connectivity configuration and the UE 610 provides the carrier grouping based on this information. The UE 610 can skip information of carrier grouping that the network does not support/intend to use for configuring dual connectivity in certain bands.

In an example, the sequence diagram 600 includes the network node 620 sending a UE capability enquiry to the UE 610 and the UE 610 responding with UE capability information. The UE capability enquiry is associated with the UE's 610 support of carrier grouping for dual connectivity. In one illustration, the UE capability enquiry indicates that the network node 620 supports a set of band combinations for the dual connectivity. For instance, this enquiry not only identifies the bands that the network supports for CA, but can also identify a subset of these bands that the network supports for DC. As such, in the UE capability information, the UE can indicate its supported band combinations (e.g., for CA). From these CA-supported band combinations, the UE 610 can determine the subset of band combinations that the UE 610 supports for DC. The UE 610 can then cross-check this subset with the band combination set indicated by the network 620 as being supported for the dual connectivity. In particular, for each band combination in the subset, the UE 610 determines the bands of the band combination and whether these bands are supported by the network node 620 (or more generally the network) for the dual connectivity. If so, the band combination belongs to a final set. If not, the band combination is not included in the final set. For each band combination in the final set, the UE capability information can indicate that the UE 610 supports using this band combination for the dual connectivity. Further, the UE capability information can indicate the corresponding portion of the carrier grouping information (e.g., the full set of variants for that band combination).

To illustrate, consider the following example. In the UE capability enquiry, the network node 620 indicates that it supports the bands "n1,n2,n3,n4,n5" (e.g., for CA purposes) and only bands "n1,n3,n4" for DC purposes. In response, the UE 610 reports that it supports the band combination "n1,n2" for CA but not DC and the band combination "n1,n3,n4" for DC (and CA). Because the band combination "n1,n2" is not supported for DC, the UE 610 does not report carrier grouping information for this band combination. In comparison, because the band combination "n1,n3,n4" is supported for DC, the UE 610 reports its grouping information for this band combination. Assume in this case that the UE 610 supports two variants. The first variant is "NR band n1" being allocated to an MCG (e.g., one or more carriers therefrom being configured as corresponding serving cell(s) in the MCG) and "NR band n3" and "NR band n4" being allocated to an SCG (e.g., one or more carriers therefrom being configured as corresponding serving cell(s) in the SCG). The second variant is "NR band n i" and "NR band n4" being allocated to the MCG and "NR band 3" allocated to the SCG. In this illustration, the UE 610 reports the first variant and the second variant to the network node 620. Similar carrier configuration information for other UE-supported band combinations for dual connectivity can be reported to the network node 620.

In response, the network node 620 can store the UE capability information (including the reported carrier aggregation information) in the network (e.g., at a core network). The network node 620 can also configure the MCG and the SCG for the UE 610 based on the reported carrier aggregation information. For instance, the network node 620 may use the second variant to configure a set of carriers in the "NR band n1" and/or "NR band n4" as a set of serving cells in the MCG and a set of carriers in the "NR band n3" as a set of serving cells in the SCG.

Figure 7:
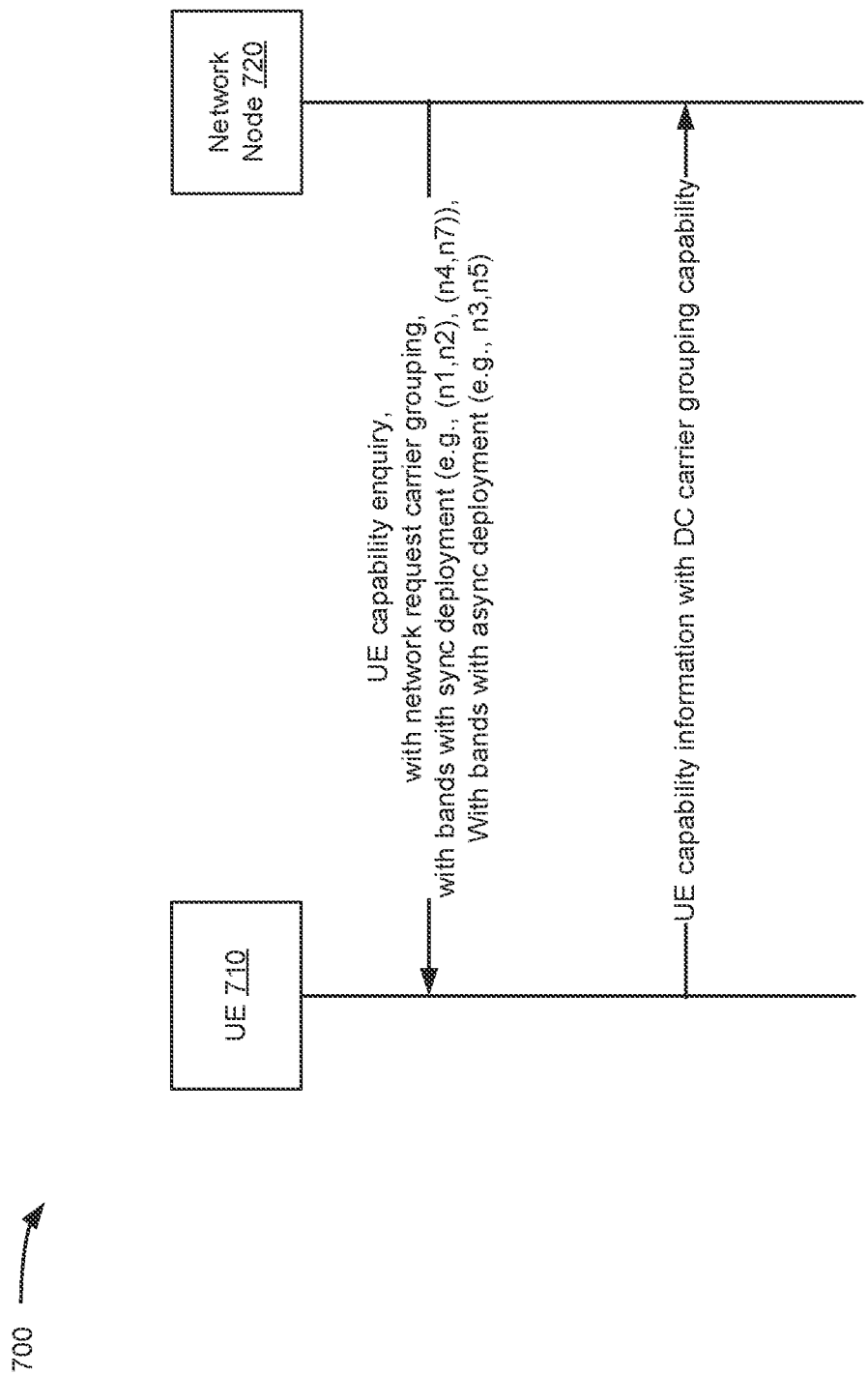
FIG. 7 illustrates a further example of a sequence diagram showing signaling between a UE and a network node for enquiring about a UE capability for carrier grouping, in accordance with some embodiments.

FIG. 7 illustrates a further example of a sequence diagram showing signaling between a UE and a network node for enquiring about a UE capability for carrier grouping, in accordance with some embodiments. In an example, the signaling is RRC signaling that is exchanged as part of the capability transfer procedure during registration, described in connection with FIG. 3. The UE 710 and the network node 720 are examples of the UE 310 and the network node 320, respectively, of FIG. 3. Relative to the sequence diagram 600, the information exchange is even more granular here. In this sequence diagram 700, the network node 720 may indicate sets of bands that the network node 720 (or more generally the network) supports for synchronous dual connectivity and sets of bands that the network node 720 (or more generally the network) supports for asynchronous dual connectivity. In response to this indication, the UE 710 sends its carrier grouping information. Here, like the sequence diagram 400 of FIG. 4, the carrier grouping information can be the full set of variants that the UE 710 supports. Alternatively, the UE 710 can use the indicators of the bands for synchronous DC and asynchronous DC as filters in a look-up of its data structure to then report only the portion of the configuration information that corresponds to the indicated bands for synchronous DC and the portion of the configuration information that corresponds to the indicated bands for asynchronous DC.

As such, the sequence diagram 700 is an example of an approach, where the network deployment of different carriers is such that if certain carriers have (or do not have) any timing linkage, then it is not possible to support both asynchronous and synchronous versions of cell groups. For instance, if the network is using "NR band n1," "NR band n2," and "NR band n3" and if "NR band n1," "NR band n3" are not synchronized in time, the network cannot configure synchronous NR-DC with "NR band n1," "NR band n3". In this sequence diagram 700, the network provides the sets of bands that the network intends to use only in synchronous DC deployment and the sets of bands the network intends to use in a synchronous DC deployment. In response, the UE 710 indicates its supported carrier grouping based on this information. The UE 710 can skip carrier grouping that the network does not support and/or intend to configure.

In an example, the sequence diagram 700 includes the network node 720 sending a UE capability enquiry to the UE 710 and the UE 710 responding with UE capability information. The UE capability enquiry is associated with the UE's 710 support of carrier grouping for dual connectivity. In one illustration, the UE capability enquiry indicates that the network node 720 supports a set of band combinations for a synchronous deployment of the dual connectivity. Additionally or alternatively, the UE capability enquiry indicates that the network node supports a set of band combinations for an asynchronous deployment of the dual connectivity. For instance, this enquiry not only identifies the bands that the network supports for CA and a subset of these bands that the network supports for DC, but it also indicates which particular bands from the subset can be used by the network node 620 (or more generally the network) for synchronous DC and which other particular bands from the subset can be used by the network node 620 (or more generally the network) for asynchronous DC. As such, in the UE capability information, the UE can indicate its supported band combinations (e.g., for CA). From these CA-supported band combinations, the UE 710 can determine the subset of band combinations that the UE 710 supports for DC. The UE 710 can then cross-check this subset with the band combination set indicated by the network 720 as being supported for the synchronous dual connectivity and with the band combination set indicated by the network 720 as being supported for the asynchronous dual connectivity. In particular, for each band combination in the subset, the UE 710 determines the bands of the band combination and whether these bands are supported by the network node 720 (or more generally the network) for the synchronous or asynchronous dual connectivity. If supported for the synchronous DC deployment, the band combination belongs to a first final set associated with the synchronous DC deployment. If supported for the asynchronous DC deployment, the band combination belongs to a second final set associated with the asynchronous DC deployment. Otherwise, the band combination is not included in the first or second final set. For each band combination in the first final set, the UE capability information can indicate that the UE 710 supports using this band combination for the synchronous dual connectivity. For each band combination in the second final set, the UE capability information can indicate that the UE 710 supports using this band combination for the asynchronous dual connectivity. Further, the UE capability information can indicate the corresponding portion of the carrier grouping information (e.g., the full set of variants for each band combination in the first and second final sets).

To illustrate, consider the following example. In the UE capability enquiry, the network node 720 indicates that it supports the bands "n1,n2,n3,n4,n5,n6,n7" (e.g., for CA purposes), only bands "n1,n2" and "n4,n7" for synchronous DC deployment and bands "n3,n5" for asynchronous DC deployment. In response, the UE 710 reports that it supports the band combination "n1,n2" for CA but not DC and the band combination "n4,n7" and "n3,n5" for DC (and CA). Because the band combination "n1,n2" is not supported for DC, the UE 710 does not report carrier grouping information for this band combination. In comparison, because the band combination "n4,n7" is supported for DC, the UE 710 reports its grouping information for this band combination. Likewise, because the band combination "n3,n5" is supported for DC, the UE 710 reports its grouping information for this band combination.

In response, the network node 720 can store the UE capability information (including the reported carrier aggregation information) in the network (e.g., at a core network). The network node 720 can also configure the MCG and the SCG for the UE 710 based on the reported carrier aggregation information. For instance, the network node 720 may a supported variant associated with the "n4,n7" band combination to configure a set of carriers therefrom in an MCG and an SCG for synchronous dual connectivity.

Figure 8:
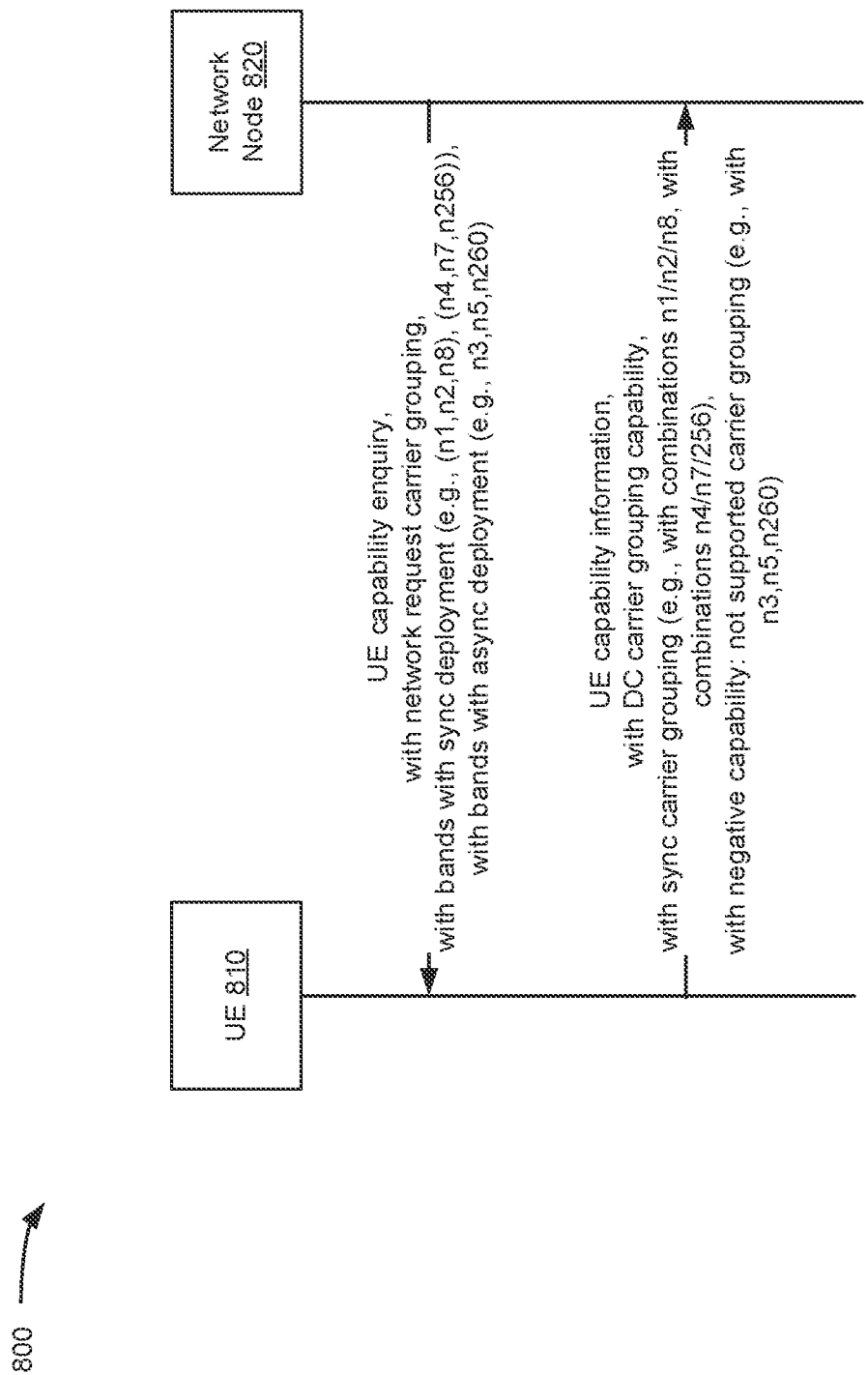
FIG. 8 illustrates an example of a sequence diagram showing signaling between a UE and a network node for reporting a UE capability for carrier grouping, in accordance with some embodiments.

FIG. 8 illustrates an example of a sequence diagram 800 showing signaling between a UE 810 and a network node 820 for reporting a UE capability for carrier grouping, in accordance with some embodiments. In an example, the signaling is RRC signaling that is exchanged as part of the capability transfer procedure during registration, described in connection with FIG. 3. The UE 810 and the network node 820 are examples of the UE 310 and the network node 320, respectively, of FIG. 3. Relative to the sequence diagrams 400-700, the reported UE capacity information indicates a negative capability. This negative capability can be reported in addition to or in the alternative of the carrier configuration information described in connection with the sequence diagrams 400-700 (e.g., positive capability information). Generally, negative capability information is a type of carrier grouping information. However, rather than indicating what it can support, the UE 810 indicates what it cannot support. For instance, the UE capability information indicates bands of a band combination that the UE 810 supports for dual connectivity. The carrier grouping information of this UE capability can include negative capability information indicating that the UE 810 cannot support first carriers from a first subset of the bands being grouped in a cell group (e.g., an MCG or an SCG). In certain situations, the data size for reporting the negative capability is smaller than the data size for reporting the positive capability (e.g., what the UE 810 can support). As such, reporting the negative capability can further reduce the signaling overhead.

As such, the sequence diagram 800 is an example of an approach, where the UE 810 may not be able to support only a few carrier grouping for DC (e.g., it supports a large number of variants and/or a large number of band combinations). In such a case, it would be beneficial to inform the network about carrier grouping that the UE 810 does not support and allow the network to assume all other carrier grouping are supported. Accordingly, as part of the UE capability response, the UE 810 includes the set of negative support capability for carrier grouping, such as the set of carrier grouping that it does not support, while allowing the network to assume that the UE 810 supports all other carrier grouping.

In an example, the sequence diagram 800 includes the network node 820 sending a UE capability enquiry to the UE 810 and the UE 810 responding with UE capability information. The UE capability enquiry is associated with the UE's 810 support of carrier grouping for dual connectivity. This enquiry can be similar to any of the UE capability enquiries described in connection with the sequence diagrams 400-700. In the illustration of FIG. 8, the UE capability enquiry is similar to the one of the sequence diagram 700, in which the network node 810 explicitly indicates the bands for synchronous dual connectivity and asynchronous dual connectivity. From this enquiry, the UE 820 can determine the band combinations that the UE 820 supports for CA, the subset of these band combinations that the UE 820 supports for DC, and, as applicable, the division of this subset between the band combinations that the UE 810 supports for synchronous DC and the band combinations that the UE 810 supports for asynchronous DC. The UE 820 can report this positive capability. Additionally or alternatively, the UE 820 can determine the negative capability. For instance, the subset of the band combinations that the UE 820 supports for DC is associated with a total number of synchronization-agnostic variants. The band combinations supported for synchronous DC is associated with a first number of supported variants for synchronous DC. Similarly, the band combinations supported for asynchronous DC is associated with a first number of supported variants for asynchronous DC. The negative capability corresponds to negative variants that are the difference between the synchronization-agnostic variants and the synchronous DC supported variants and asynchronous DC supported variants. In the UE capability information, the UE 820 can indicate these negative variants.

To illustrate, consider the following example. In the UE capability enquiry, the network node 820 indicates that it supports the bands "n1,n2,n3,n4,n5,n6,n7,n8,n256,n260" (e.g., for CA purposes), only bands "n1,n2,n8" and "n4,n7, n256" for synchronous DC deployment and bands "n3,n5, n260" for asynchronous DC deployment. In response, the UE 810 reports that it supports the band combination "n1,n2" for CA but not DC, and the band combinations "n1,n2,n8" and "n2,n7,n256" for DC (and CA). Because the band combination "n1,n2" is not supported for DC, the UE 810 does not report carrier grouping information for this band combination. In comparison, because the band combinations "n1,n2,n8" and "n2,n7,n256" are supported for DC, the UE 810 reports their grouping information. This corresponds to positive carrier grouping information. Alternatively, the UE 810 that it does not support the band combination "n3,n5,n260" for DC (in which case, the network can assume that the band combinations "n1,n2,n8" and "n2,n7,n256" are supported for DC). Here, the UE 810 can merely identify the band combination "n3,n5,n260" with an attribute that it is not supported for DC. Or, the UE 810 can include the corresponding portion of carrier grouping information (e.g., the variants of the band combination "n3,n5, n260").

In response, the network node 820 can store the UE capability information (including the reported carrier aggregation information) in the network (e.g., at a core network). The network node 820 can also configure the MCG and the SCG for the UE 810 based on the reported carrier aggregation information. For instance, the network node 820 may determine a supported variant associated with the "n4,n256" band combination to configure a set of carriers therefrom in an MCG and an SCG for synchronous dual connectivity.

Figure 9:
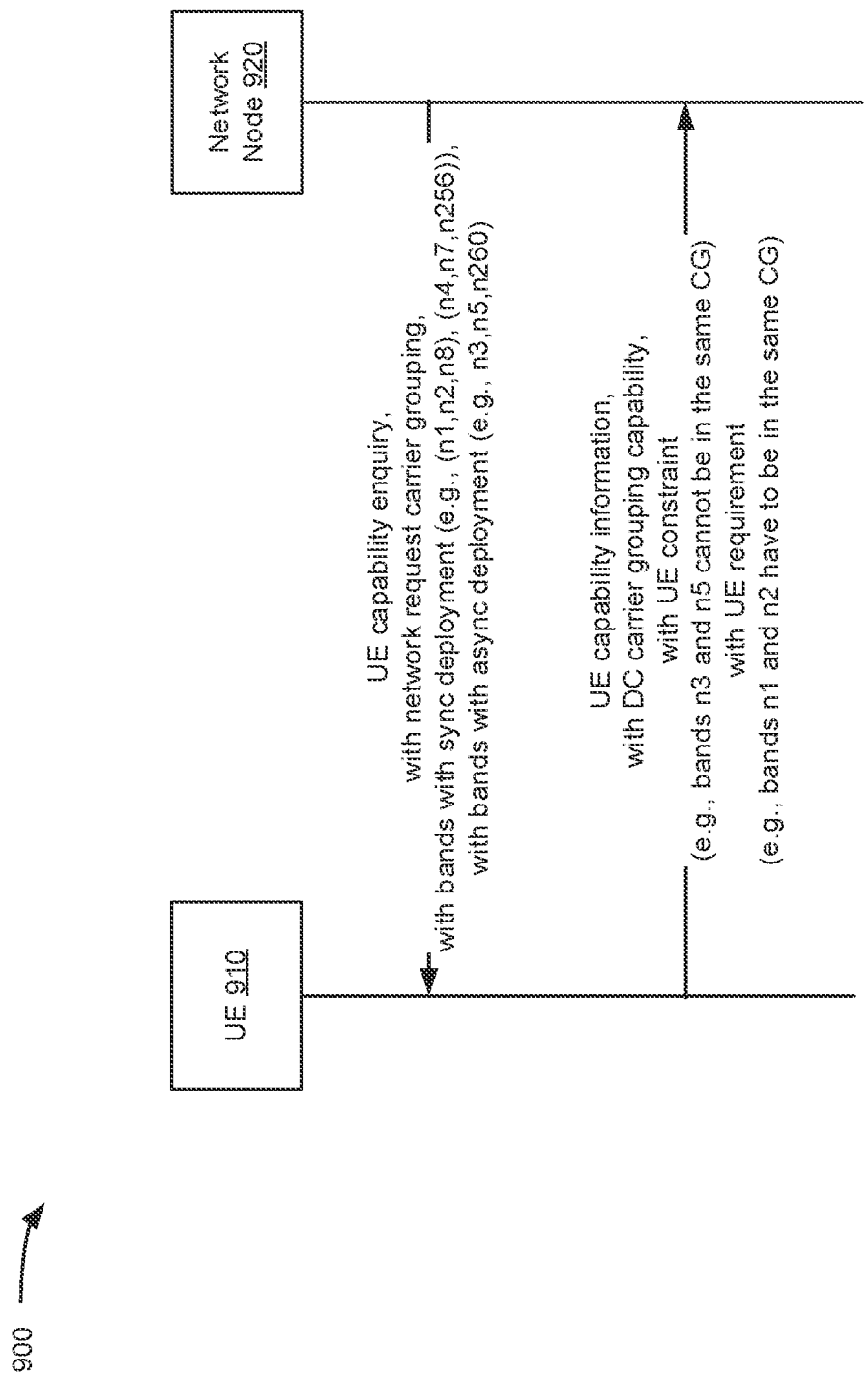
FIG. 9 illustrates another example of a sequence diagram showing signaling between a UE and a network node for reporting a UE capability for carrier grouping, in accordance with some embodiments.

FIG. 9 illustrates another example of a sequence diagram 900 showing signaling between a UE 910 and a network node 920 for reporting a UE capability for carrier grouping, in accordance with some embodiments. In an example, the signaling is RRC signaling that is exchanged as part of the capability transfer procedure during registration, described in connection with FIG. 3. The UE 910 and the network node 920 are examples of the UE 310 and the network node 320, respectively, of FIG. 3. Relative to the sequence diagrams 400-700, the reported UE capacity information indicates a UE constraint and/or a UE requirement. The UE constraint and/or the UE requirement can be reported in addition to or in the alternative of the carrier configuration information described in connection with the sequence diagrams 400-700 (e.g., positive capability information). Generally, UE constraint information and UE requirement information are each a type of carrier grouping information. In a way, the constraint can be a negative version of a requirement. Here, rather than indicating what it can support or cannot support, the UE 910 indicates some constraint(s) about grouping a set of carriers from a set of bands in a cell group. If the constraint is violated, the UE 920 would not be able to support the dual connectivity. For instance, the carrier grouping information indicates a UE constraint on grouping first carriers from bands in a cell group (MCG or SCG). This UE constraint can indicate that the UE 910 cannot support a first carrier from a first band of the bands being grouped in the cell group with a second carrier from a second band of the bands. Or, the UE constraint can indicate the UE can support the first carrier being grouped in the cell group without the second carrier being grouped in the cell group. Similarly, the UE 910 indicates some requirement(s) about grouping set of carriers from a set of bands in the same or a different cell group. If the requirement is not met, the UE 910 would not be able to support the dual connectivity. For instance, a UE requirement is to group some carriers from the bands in the cell group. Or, the UE requirement indicates that the UE 910 can support a first carrier from a first band of the bands being grouped in the cell group only when a second carrier from a second band of the bands is also grouped in the cell group.

As such, the sequence diagram 900 is an example of an approach, where the UE 910 may not support a specific band in a specific cell group. For instance, if "NR band n1" (e.g., at least one carrier therefrom) is present in a cell group, then "NR band n2" (e.g., at least one carrier therefrom), cannot be in the same cell group. Or, "NR band n3" (e.g., at least one carrier therefrom) has to be in the same cell group as "NR band n1" (e.g., at least one carrier therefrom). The UE 910 should be able to reduce the signaling overhead by just reporting such constraints and/or requirements. As part of the UE capability information, the UE 910 includes the set of associations (e.g., constraints and/or requirements) related to specific bands and let the network assume that as long as the association are honored in the allocation of carriers to cell groups, the UE 910 would support the allocation.

In an example, the sequence diagram 900 includes the network node 920 sending a UE capability enquiry to the UE 910 and the UE 910 responding with UE capability information. The UE capability enquiry is associated with the UE's 910 support of carrier grouping for dual connectivity. This enquiry can be similar to any of the UE capability enquiries described in connection with the sequence diagrams 400-700. In the illustration of FIG. 9, the UE capability enquiry is similar to the one of the sequence diagram 700, in which the network node 910 explicitly indicates the bands for synchronous dual connectivity and asynchronous dual connectivity. From this enquiry, the UE 920 can determine the band combinations that the UE 920 supports for CA, the subset of these band combinations that the UE 920 supports for DC, and, as applicable, the division of this subset between the band combinations that the UE 910 supports for synchronous DC and the band combinations that the UE 910 supports for asynchronous DC. The UE 910 can report this positive capability. Additionally or alternatively, the UE 910 can determine a UE constraint and/or a UE requirement. For instance, for the subset of the band combinations that the UE 910 supports for DC (or, more granularly, from the synchronous and asynchronous DC support), the UE 910 can determine from its data structure that certain bands cannot be grouped together in one or more cell groups, resulting in one or more UE constrains, and that certain bands have to be grouped together, resulting in one or more UE requirements. The UE 910 can then include the relevant information about its determination in the UE capability information.

To illustrate, consider the following example. In the UE capability enquiry, the network node 920 indicates that it supports the bands "n1,n2,n3,n4,n5,n6,n7,n8,n256,n260" (e.g., for CA purposes), only bands "n1,n2,n8" and "n4,n7,n256" for synchronous DC deployment and bands "n3,n5,n260" for asynchronous DC deployment. In response, the UE 910 reports that it supports the band combination "n1,n2" for CA but not DC, and the band combinations "n1,n2,n3" and "n1,n2,n5" for DC (and CA). Because the band combination "n1,n2" is not supported for DC, the UE 910 does not report carrier grouping information for this band combination. The UE 910 also looks up its variants for the DC supported bad combinations "n1,n2,n8" and "n2,n7,n256" and determines that the variants indicate that "NR band n1" and "NR band n2" (or carriers therefrom) have to be grouped in the same cell group (e.g., the MCG or the SCG, or one of them depending on the support information stored in the data structure). As such, the UE 910 generates a UE requirement that "NR band n1" and "NR band n2" (or carriers therefrom) have be the grouped in the same cell group. Similarly, the UE 910 determines that "NR band n3" and "NR band n5" cannot be grouped in the same cell group. As such, the UE 910 generates a UE constraint "NR band n3" and "NR band n5" (or carriers therefrom) cannot be grouped in the same cell group. The UE 910 then indicates the UE constraint and the UE requirement in the carrier grouping information included in the UE capability information.

In response, the network node 920 can store the UE capability information (including the reported carrier aggregation information) in the network (e.g., at a core network). The network node 920 can also configure the MCG and the SCG for the UE 910 based on the reported carrier aggregation information. For instance, "the network node 920 may configure a set of carriers from the NR band n1" and "NR band n2" in an MCG or an SCG for synchronous dual connectivity.

Figure 10:
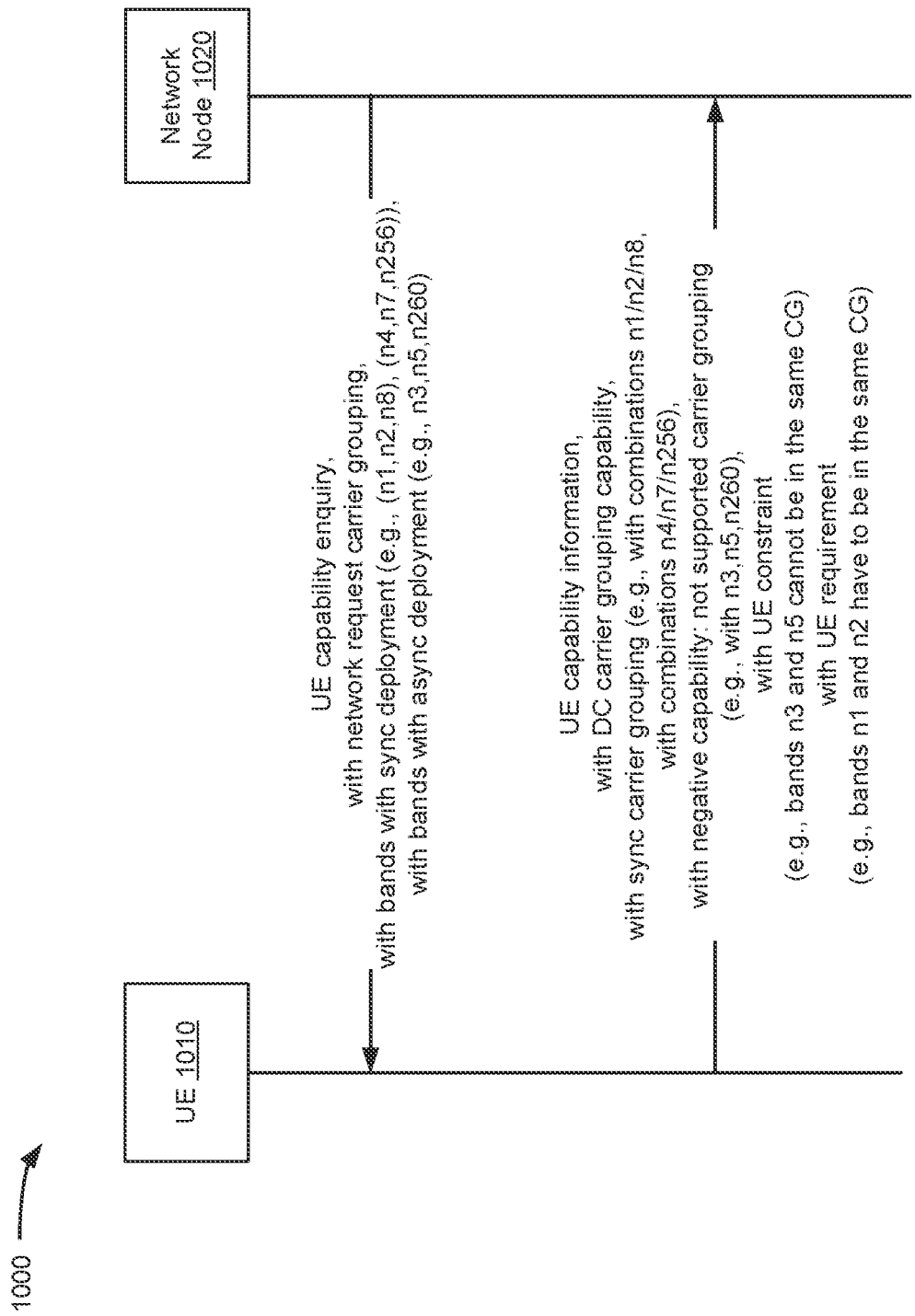
FIG. 10 illustrates yet another example of a sequence diagram showing signaling between a UE and a network node for reporting a UE capability for carrier grouping, in accordance with some embodiments.

FIG. 10 illustrates yet another example of a sequence diagram 1000 showing signaling between a UE 1010 and a network node 1020 for reporting a UE capability for carrier grouping, in accordance with some embodiments. In an example, the signaling is RRC signaling that is exchanged as part of the capability transfer procedure during registration, described in connection with FIG. 3. The UE 1010 and the network node 1020 are examples of the UE 310 and the network node 320, respectively, of FIG. 3. Relative to the sequence diagrams 400-900, the reported UE capacity information includes a combination of positive capability information, negative capability information. UE constraint information, and/or UE requirement information. Here, flexibility is achieved, whereby the network can inquire with any level of granularity and, in response, the UE 1010 can respond with the proper level of capability information. As such, the sequence diagram 1000 is an example of an approach, where the network can choose to request the UE 1010 to send a combination of carrier grouping request and the UE 1010 can choose to provide the proper level of capability information (e.g., synchronous carrier grouping with a UE constraint, asynchronous carrier grouping without another UE constraint, or only listing the actual supported carrier grouping).

To illustrate, consider the following example. In the UE capability enquiry, the network node 1020 indicates that it supports the bands "n1,n2,n3,n4,n5,n6,n7,n8,n256,n260" (e.g., for CA purposes), only bands "n1,n2,n8" and "n4,n7, n256" for synchronous DC deployment and bands "n3,n5, n260" for asynchronous DC deployment. The UE capability enquiry may, but need not, also indicate the type(s) of carrier grouping information to include in the response (e.g., positive capability information, negative capability information, and/or UE constraint information). If not explicitly indicated in the UE capability enquiry, the UE 1010 may select a particular type(s) based on a default setting or based on pre-programmed logic (e.g., a prioritization logic, a logic that determines selects the type(s) that would provide the most amount of information with the least possible data size, and the like). In the illustration FIG. 10, the UE 1010 reports that it supports the band combination "n1,n2" for CA but not DC, the band combinations "n1,n2,n8" and "n4,n7,n256" for synchronous DC, band combinations "n3,n5,260" for asynchronous DC, a UE constrain that "NR band n3" and "NR band n5" cannot be grouped in an MCG, and "N band n1" and "NR band n2" can only be allocated to an SCG.

In response, the network node 1020 can store the UE capability information (including the reported carrier aggregation information) in the network (e.g., at a core network). The network node 1020 can also configure the MCG and the SCG for the UE 1010 based on the reported carrier aggregation information. For instance, the network node 1020 may configure a set of carriers from the "NR band n1" and "NR band n2" in the SCG and a set of carriers from the "NR band n1" and "NR band n8" in the MCG for synchronous DC.

Figure 11:
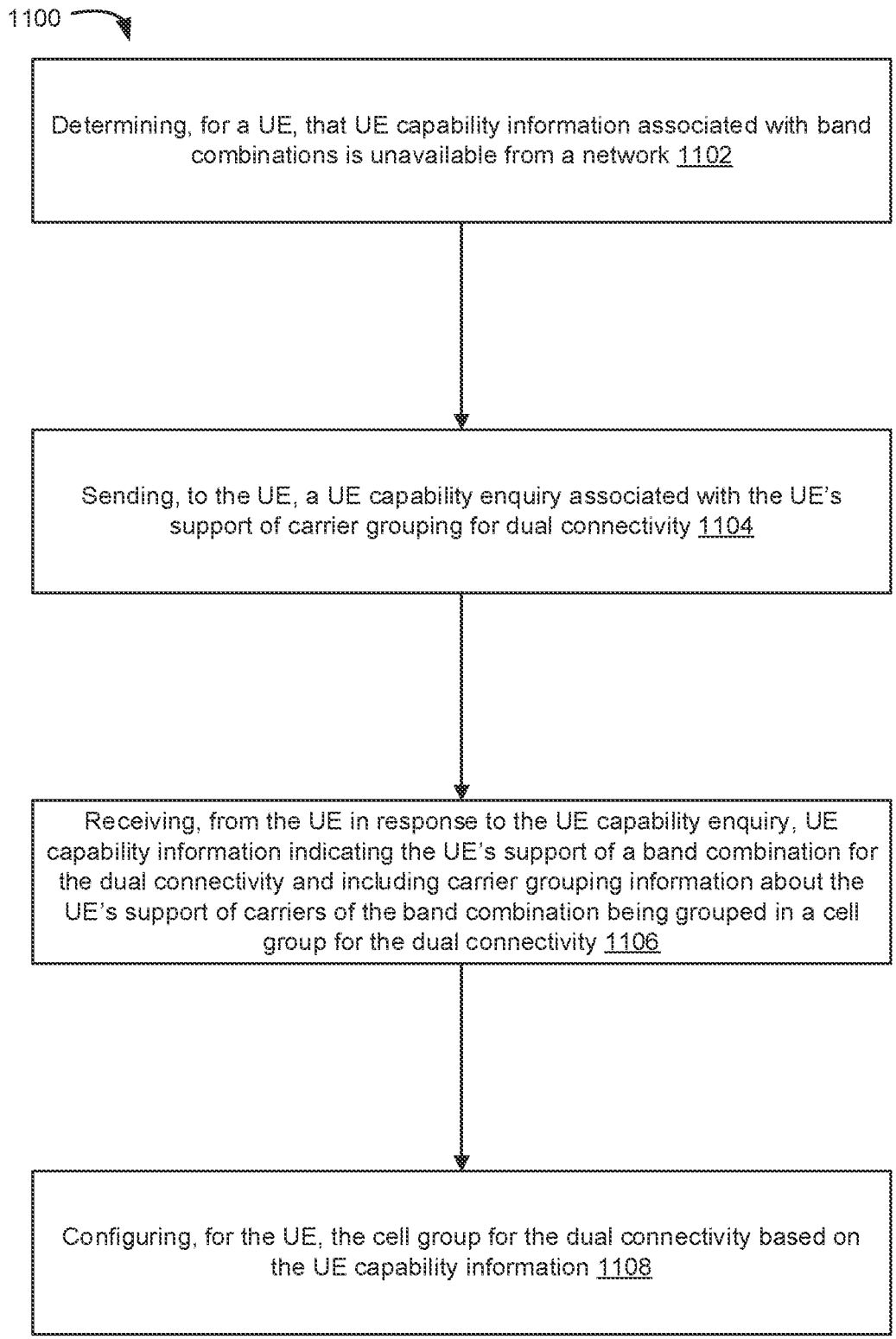
FIG. 11 illustrates an example of an operational flow/algorithmic structure for a network node configuring carrier grouping, in accordance with some embodiments.

FIG. 11 illustrates an example of an operational flow/algorithmic structure 1100 for a network node configuring carrier grouping, in accordance with some embodiments. The network node can belong to a network and can be, for example, the gnB 108, the enB 112, or any of the network nodes 320-1020, gNB 1500, or components thereof, for example, processors 1504, a base station of a different type, or a radio network core (e.g., the core network 330). The network node may configure an MCG and an SCG for a UE that supports dual connectivity.

The operation flow/algorithmic structure 1100 may include, at 1102, determining, for the UE, that UE capability information associated with band combinations is unavailable from the network. For example this determination is made as part of a capability transfer procedure during registration of the UE with the network and can include a query of a core network.

The operation flow/algorithmic structure 1100 may include, at 1104, a UE capability enquiry associated with the UE's support of carrier grouping for dual connectivity. In an example, this UE capability enquiry is sent in response to determining that the UE capability information is unavailable and can be sent via RRC signaling as part of capability transfer procedure during the registration of the UE. Further, the UE capability enquiry can include various levels of granularity and/or may implicitly or explicitly request the UE to provides its carrier grouping information, as described herein above in connection with FIGS. 4-7.

The operation flow/algorithmic structure 1100 may include, at 1106, receiving, from the UE in response to the UE capability enquiry, UE capability information indicating the UE's support of a band combination for the dual connectivity, and including carrier grouping information about the UE's support of carriers of the band combination being grouped in a cell group. For example, the UE capability information can indicate the supported band combinations for CA, the subset that is supported for DC, and positive capability information, negative capability information, the UE requirement information, and/or UE constraint information related to this subset, as described herein above in connection with FIGS. 4-10.

The operation flow/algorithmic structure 1100 may include, at 1108, configuring, for the UE, the cell group based on the UE capability information. For example, the network node is an MN and allocates radio resources using carriers from UE supported band combinations for the MCG. The network node can also inform another network node such that this network node is configured as a SN for the UE according to the UE supported band combination for the SCG. The network node can also provide information about the MCG and SCG can be provided to the UE.

Figure 12:
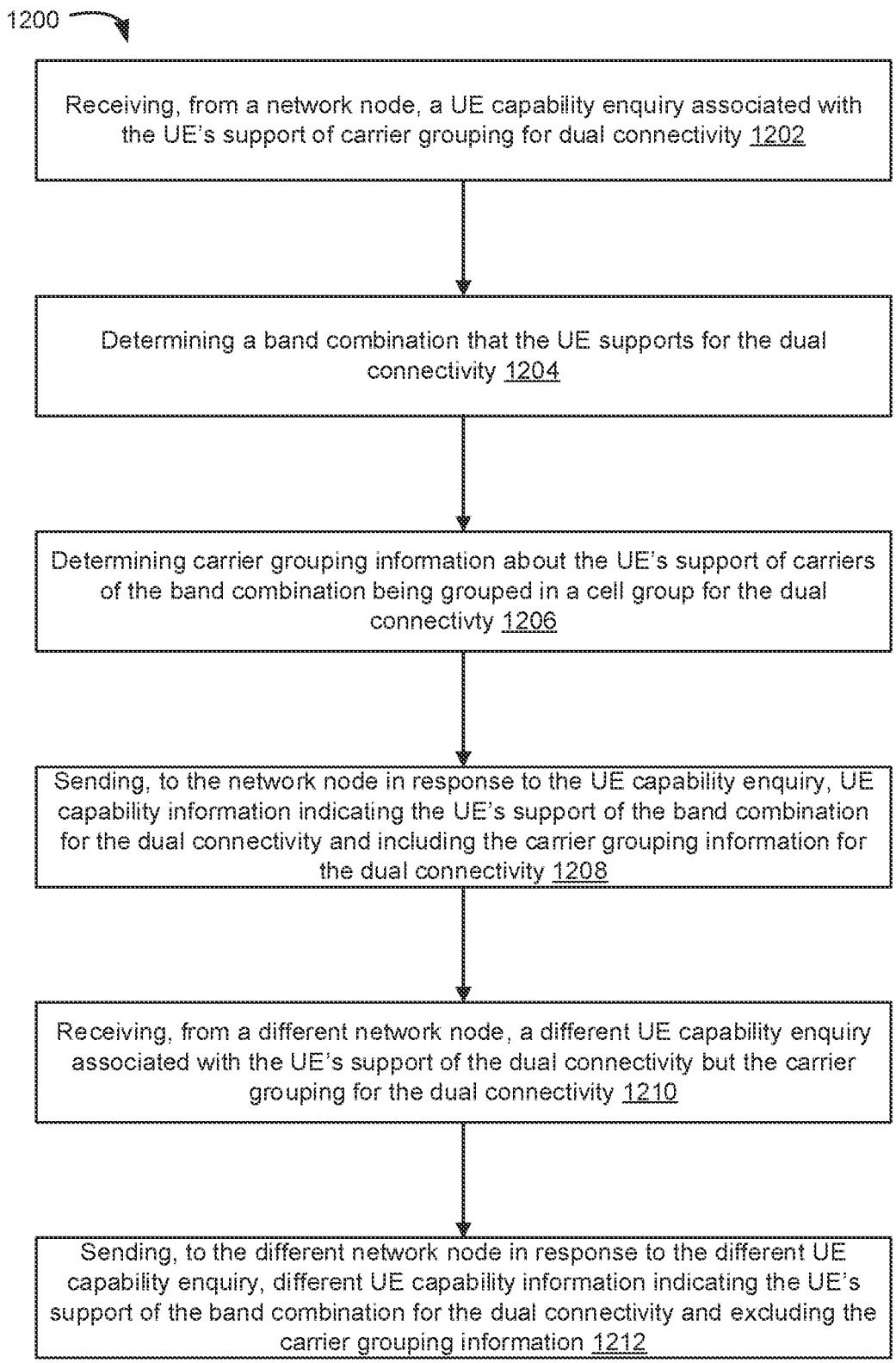
FIG. 12 illustrates an example of an operational flow/algorithmic structure for a UE reporting UE capability for carrier grouping, in accordance with some embodiments.

FIG. 12 illustrates an example of an operational flow/algorithmic structure for a UE reporting UE capability for carrier grouping, in accordance with some embodiments. The he UE can implement the operational flow/algorithmic structure 600 to determine and use a UE can be, for example, the UE 104, any of the UEs 210-1010, the UE 1400 or components thereof, for example, processors 1404. The UE supports dual connectivity and may connect to a network node of a network that may configure an MCG and an SCG for the UE The operation flow/algorithmic structure 1200 may include, at 1202, receiving, from the network node, a UE capability enquiry associated with the UE's support of carrier grouping for dual connectivity. In an example, this UE capability enquiry is sent as part of capability transfer procedure during the registration of the UE. Further, the UE capability enquiry can include various levels of granularity and/or may implicitly or explicitly request the UE to provides its carrier grouping information, as described herein above in connection with FIGS. 4-7.

The operation flow/algorithmic structure 1200 may include, at 1204, determining a band combination that the UE supports for the dual connectivity. For example, parameters from the UE capability inquiry can be used as filters in a look-up of a data structure pre-stored at the UE, where this data structure associates, per band combination that the UE supports, variants of the bands that belong to the band combinations and how these variants can be allocated to an MCG or an SCG.

The operation flow/algorithmic structure 1200 may include, at 1206, determining carrier grouping information about the UE's support of carriers of the band combination being grouped in a cell group. For example, the carrier grouping is the result of the look-up and can include positive capability information, negative capability information, and/or UE constraint information related to this subset, as described herein above in connection with FIGS. 4-10

The operation flow/algorithmic structure 1200 may include, at 1208, sending, to the network node in response to the UE capability enquiry, UE capability information indicating the UE's support of the band combination for the dual connectivity and including the carrier grouping information. For example, the UE capability information can indicate the supported band combinations for CA, the subset that is supported for DC, and the positive capability information, the negative capability information, the UE requirement information, and/or the UE constraint information related to this subset, as described herein above in connection with FIGS. 4-10

The operation flow/algorithmic structure 1200 may include, at 1210, receiving, from a different network node (e.g., of a different network), a different UE capability enquiry associated with the UE's support of the dual connectivity but not the carrier grouping for the dual connectivity. For example, this UE capability enquiry may be received upon the UE roaming to the different network and participating in another capability transfer procedure during its registration with the different network. Here, the UE capability enquiry may not implicitly or explicitly request the UE to provides its carrier grouping information (e.g., because the network does not support DC or already has this information about the UE).

The operation flow/algorithmic structure 1200 may include, at 1212, sending, to the different network node in response to the different UE capability enquiry, different UE capability information indicating the UE's support of the band combination for the dual connectivity and excluding the carrier grouping information. For example, the UE capability information can indicate the supported band combinations for CA and the subset that is supported for DC, but does include any of the positive capability information, the negative capability information, the UE requirement information, or the UE constraint information.

Figure 13:
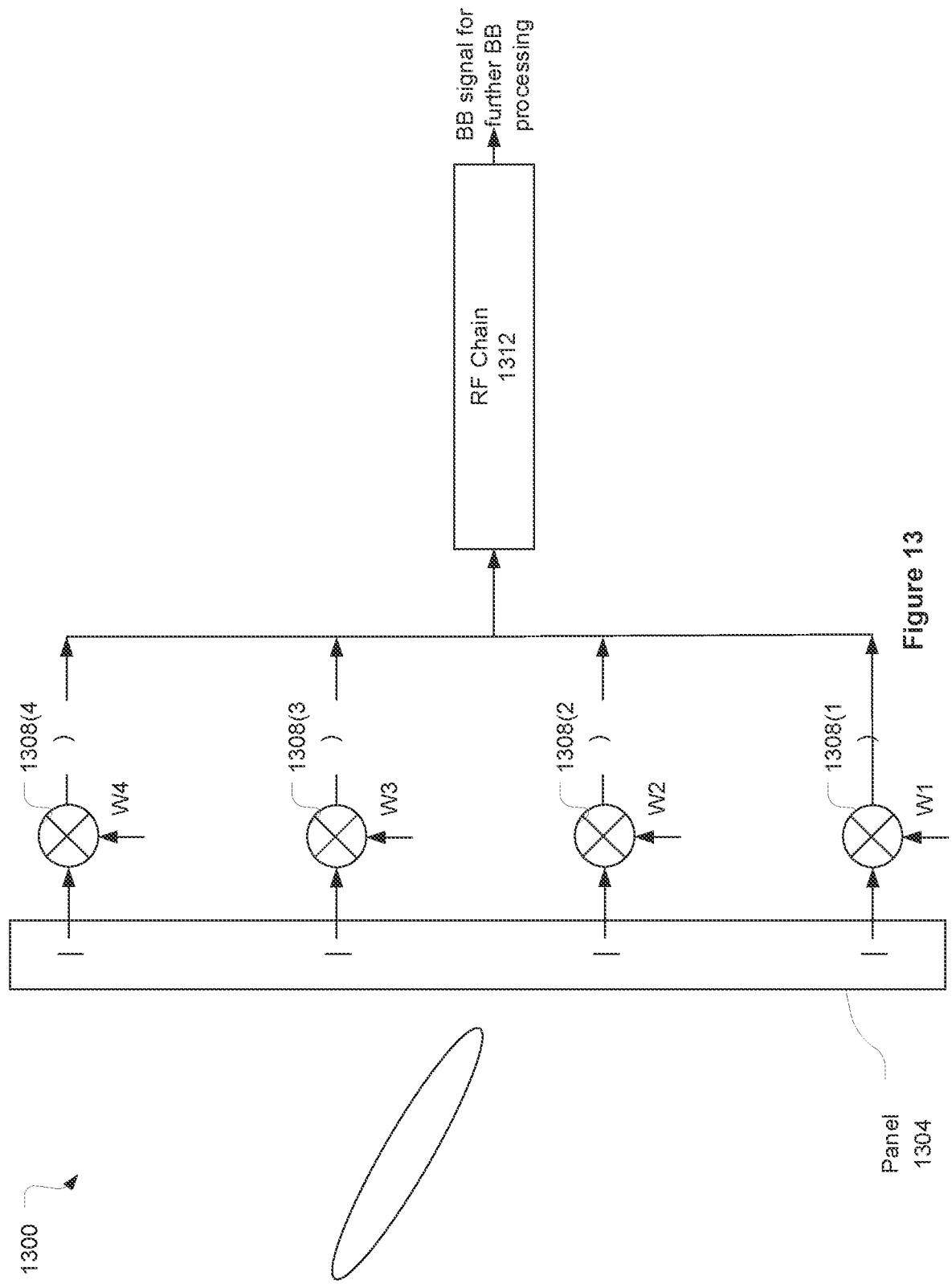
FIG. 13 illustrates an example of receive components, in accordance with some embodiments.

FIG. 13 illustrates receive components 1300 of the UE 104 in accordance with some embodiments. The receive components 1300 may include an antenna panel 1304 that includes a number of antenna elements. The panel 1304 is shown with four antenna elements, but other embodiments may include other numbers.

The antenna panel 1304 may be coupled to analog beamforming (BF) components that include a number of phase shifters 1308(1)-1308(4). The phase shifters 1308(1)-1308(4) may be coupled with a radio-frequency (RF) chain 1312. The RF chain 1312 may amplify a receive analog RF signal, down convert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values to the phase shifters 1308(1)-1308(4) to provide a receive beam at the antenna panel 1304. These BF weights may be determined based on the channel-based beamforming.

Figure 14:
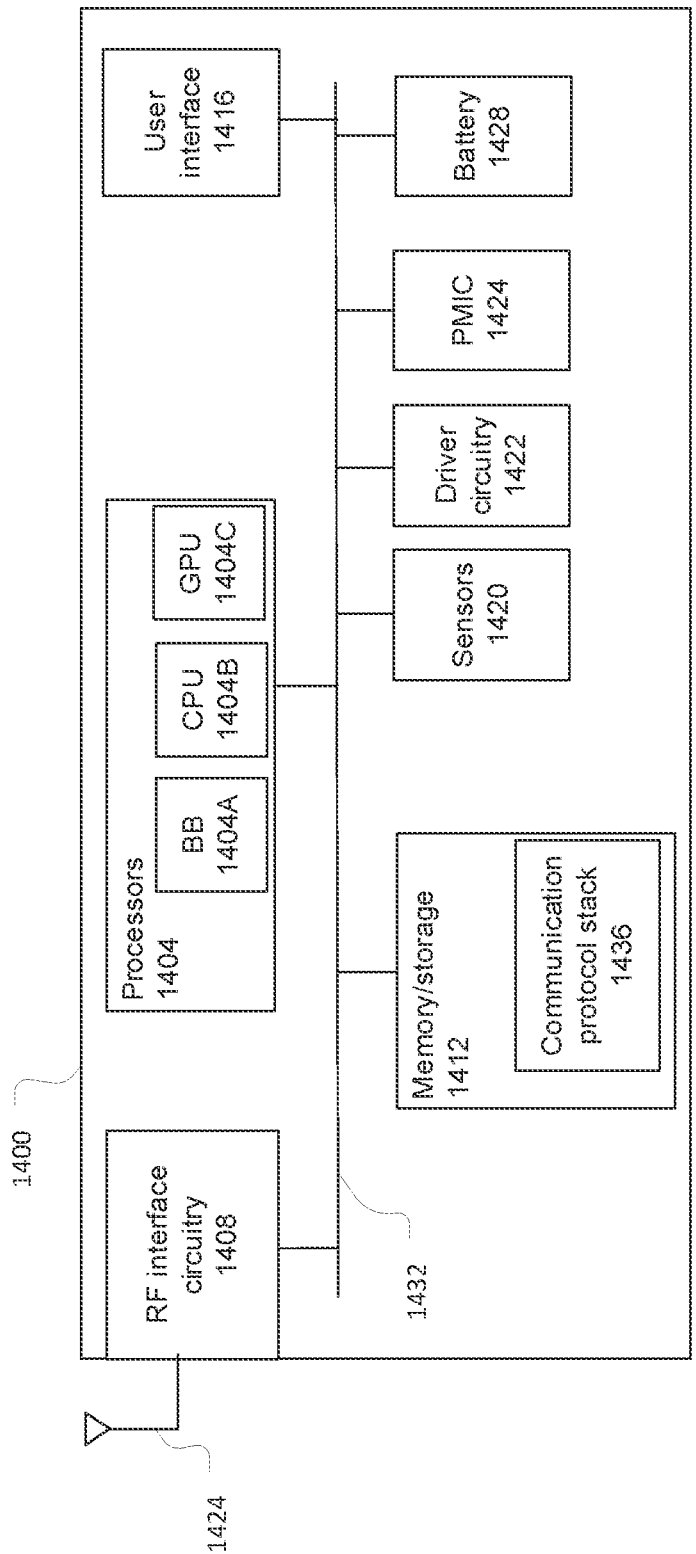
FIG. 14 illustrates an example of a UE, in accordance with some embodiments.

FIG. 14 illustrates a UE 1400 in accordance with some embodiments. The UE 1400 may be similar to and substantially interchangeable with UE 104 of FIG. 1.

Similar to that described above with respect to UE 104, the UE 1400 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, and actuators), video surveillance/monitoring devices (for example, cameras, and video cameras), wearable devices, or relaxed-IoT devices. In some embodiments, the UE may be a reduced capacity UE or NR-Light UE.

The UE 1400 may include processors 1404, RF interface circuitry 1408, memory/storage 1412, user interface 1416, sensors 1420, driver circuitry 1422, power management integrated circuit (PMIC) 1424, and battery 1428. The components of the UE 1400 may be implemented as integrated circuits (ICs), portions thereof, discrete electronic devices, or other modules, logic, hardware, software, firmware, or a combination thereof. The block diagram of FIG. 14 is intended to show a high-level view of some of the components of the UE 1400. However, some of the components shown may be omitted, additional components may be present, and different arrangements of the components shown may occur in other implementations.

The components of the UE 1400 may be coupled with various other components over one or more interconnects 1432 which may represent any type of interface, input/output, bus (local, system, or expansion), transmission line, trace, optical connection, etc. that allows various circuit components (on common or different chips or chipsets) to interact with one another.

The processors 1404 may include processor circuitry such as, for example, baseband processor circuitry (BB) 1404A, central processor unit circuitry (CPU) 1404B, and graphics processor unit circuitry (GPU) 1404C. The processors 1404 may include any type of circuitry or processor circuitry that executes or otherwise operates computer-executable instructions, such as program code, software modules, or functional processes from memory/storage 1412 to cause the UE 1400 to perform operations as described herein.

In some embodiments, the baseband processor circuitry 1404A may access a communication protocol stack 1436 in the memory/storage 1412 to communicate over a 3GPP compatible network. In general, the baseband processor circuitry 1404A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1408.

The baseband processor circuitry 1404A may generate or process baseband signals or waveforms that carry information in 3GPP-compatible networks. In some embodiments, the waveforms for NR may be based on cyclic prefix OFDM (CP-OFDM) in the uplink or downlink and discrete Fourier transform spread OFDM (DFT-S-OFDM) in the uplink.

The baseband processor circuitry 1404A may also access group information 1424 from memory/storage 1412 to determine search space groups in which a number of repetitions of a PDCCH may be transmitted.

The memory/storage 1412 may include any type of volatile or non-volatile memory that may be distributed throughout the UE 1400. In some embodiments, some of the memory/storage 1412 may be located on the processors 1404 themselves (for example, L1 and L2 cache), while other memory/storage 1412 is external to the processors 1404 but accessible thereto via a memory interface. The memory/storage 1412 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1408 may include transceiver circuitry and a radio frequency front module (RFEM) that allows the UE 1400 to communicate with other devices over a radio access network. The RF interface circuitry 1408 may include various elements arranged in transmit or receive paths. These elements may include switches, mixers, amplifiers, filters, synthesizer circuitry, control circuitry, etc.

In the receive path, the RFEM may receive a radiated signal from an air interface via an antenna 1424 and proceed to filter and amplify (with a low-noise amplifier) the signal. The signal may be provided to a receiver of the transceiver that down-converts the RF signal into a baseband signal that is provided to the baseband processor of the processors 1404.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1424.

In various embodiments, the RF interface circuitry 1408 may be configured to transmit/receive signals in a manner compatible with NR access technologies.

The antenna 1424 may include a number of antenna elements that each convert electrical signals into radio waves to travel through the air and to convert received radio waves into electrical signals. The antenna elements may be arranged into one or more antenna panels. The antenna 1424 may have antenna panels that are omnidirectional, directional, or a combination thereof to enable beamforming and multiple input, multiple output communications. The antenna 1424 may include micro-strip antennas, printed antennas that are fabricated on the surface of one or more printed circuit boards, patch antennas, phased array antennas, etc. The antenna 1424 may have one or more panels designed for specific frequency bands including bands in FR1 or FR2.

The user interface circuitry 1416 includes various input/output (I/O) devices designed 14 to enable user interaction with the UE00. The user interface 14 16 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1400.

The sensors 1420 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lens-less apertures); light detection and ranging sensors; proximity sensors (for example, infrared radiation detector and the like); depth sensors; ambient light sensors; ultrasonic transceivers; microphones or other like audio capture devices; etc.

The driver circuitry 1422 may include software and hardware elements that operate to control particular devices that are embedded in the UE 1400, attached to the UE 1400, or otherwise communicatively coupled with the UE 1400. The driver circuitry 1422 may include individual drivers allowing other components to interact with or control various input/output (I/O) devices that may be present within or connected to the UE 1400. For example, driver circuitry 1422 may include a display driver to control and allow access to a display device, a touchscreen driver to control and allow access to a touchscreen interface, sensor drivers to obtain sensor readings of sensor circuitry 1420 and control and allow access to sensor circuitry 1420, drivers to obtain actuator positions of electro-mechanic components or control and allow access to the electro-mechanic components, a camera driver to control and allow access to an embedded image capture device, or audio drivers to control and allow access to one or more audio devices.

The PMIC 1424 may manage power provided to various components of the UE 1400. In particular, with respect to the processors 1404, the PMIC 1424 may control power-source selection, voltage scaling, battery charging, or DC-to-DC conversion.

In some embodiments, the PMIC 1424 may control, or otherwise be part of, various power saving mechanisms of the UE 1400. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1400 may power down for brief intervals of time and thus save power. If there is no data traffic activity for an extended period of time, then the UE 1400 may transition off to an RRC_Idle state, where it disconnects from the network and does not perform operations such as channel quality feedback, handover, etc. The UE 1400 goes into a very low power state and it performs paging where again it periodically wakes up to listen to the network and then powers down again. The UE 1400 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay, and it is assumed the delay is acceptable.

A battery 1428 may power the UE 1400, although in some examples the UE 1400 may be mounted deployed in a fixed location and may have a power supply coupled to an electrical grid. The battery 1428 may be a lithium-ion battery, a metal-air battery, such as a zinc-air battery, an aluminum-air battery, a lithium-air battery, and the like. In some implementations, such as in vehicle-based applications, the battery 1428 may be a typical lead-acid automotive battery.

Figure 15:
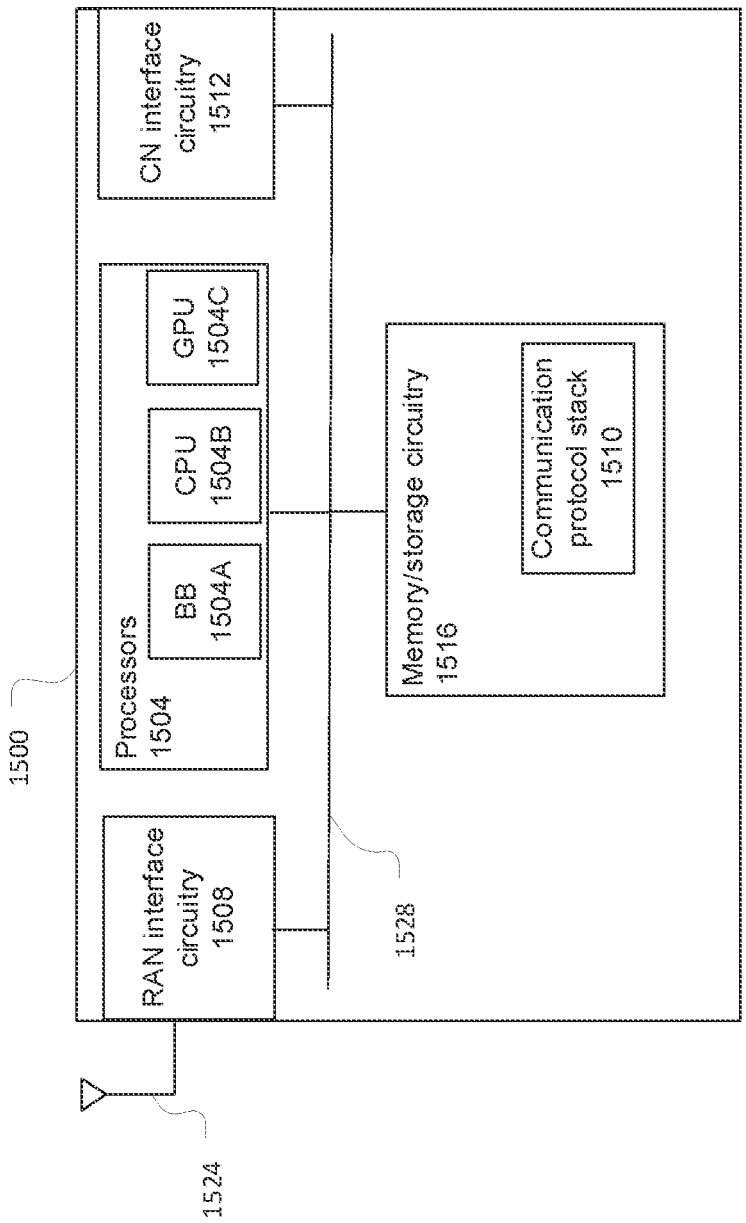
FIG. 15 illustrates an example of a base station, in accordance with some embodiments.

FIG. 15 illustrates a gNB 1500 in accordance with some embodiments. The gNB node 1500 may be similar to and substantially interchangeable with gNB 108. A base station, such as the base station 112, can have the same or similar components as the gNB 1500.

The gNB 1500 may include processors 1504. RF interface circuitry 1508, core network (CN) interface circuitry 1512, and memory/storage circuitry 1516.

The components of the gNB 1500 may be coupled with various other components over one or more interconnects 1528.

The processors 1504, RF interface circuitry 1508, memory/storage circuitry 1516 (including communication protocol stack 1510), antenna 1524, and interconnects 1528 may be similar to like-named elements shown and described with respect to FIG. 13.

The CN interface circuitry 1512 may provide connectivity to a core network, for example, a $5^{th}$ Generation Core network (5GC) using a 5GC-compatible network interface protocol, such as carrier Ethernet protocols or some other suitable protocol. Network connectivity may be provided to/from the gNB 1500 via a fiber optic or wireless backhaul. The CN interface circuitry 1512 may include one or more dedicated processors or FPGAs to communicate using one or more of the aforementioned protocols. In some implementations, the CN interface circuitry 1512 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate in accordance with one or more of the examples set forth below. For another example, circuitry associated with a UE, base station, network element, etc., as described above in connection with one or more of the preceding figures, may be configured to operate in accordance with one or more of the examples set forth below in the example section.

EXAMPLES

In the following sections, further exemplary embodiments are provided.

Example 1 includes a method. The method is implemented by a user equipment (UE). The method comprises: receiving, from a network node, a UE capability enquiry associated with the UE's support of carrier grouping for dual connectivity; determining a band combination that the UE supports for the dual connectivity; determining carrier grouping information about the UE's support of carriers of the band combination being grouped in a cell group; and sending, to the network node in response to the UE capability enquiry, UE capability information indicating the UE's support of the band combination for the dual connectivity and including the carrier grouping information for the dual connectivity.

Example 2 includes a method. The method is implemented by a network node. The method comprises: sending, to a user equipment (UE), a UE capability enquiry associated with the UE's support of carrier grouping for dual connectivity; receiving, from the UE in response to the UE capability enquiry, UE capability information indicating the UE's support of a band combination for the dual connectivity and including carrier grouping information about the UE's support of carriers of the band combination being grouped in a cell group for the dual connectivity; and configuring, for the UE, the cell group for the dual connectivity based on the UE capability information.

Example 3 includes a method of any preceding examples 1-2, wherein the UE capability enquiry indicates that the network node supports grouping a plurality of carriers from different frequency ranges in a same cell group for the dual connectivity.

Example 4 includes a method of any preceding examples 1-3, wherein the UE capability enquiry indicates that the network node supports a set of band combinations for the dual connectivity, wherein the set includes the band combination.

Example 5 includes a method of any preceding examples 1-4, wherein the UE capability enquiry indicates that the network node supports a set of band combinations for a synchronous deployment of the dual connectivity, wherein the set includes the band combination.

Example 6 includes a method of any preceding examples 1-5, wherein the UE capability enquiry indicates that the network node supports a set of band combinations for an asynchronous deployment of the dual connectivity, wherein the set includes the band combination.

Example 7 includes a method of any preceding examples 1-6, wherein the UE capability information indicates a plurality of bands that form the band combination and that are in different frequency ranges, and wherein the carrier grouping information indicates that the UE supports the carriers from the different frequency ranges being grouped in the cell group for the dual connectivity.

Example 8 includes a method of any preceding examples 1-7, wherein the second capability information is set to indicate that the UE is capable of supporting the third measurement gap configuration only if the first capability information is set to indicate that the UE is capable of supporting the first measurement gap configuration and the second measurement gap configuration wherein the UE capability information indicates a plurality of bands of the band combination, and wherein the carrier grouping information indicates that the UE supports a first carrier in a first band of the plurality of bands being grouped in a master cell group (MCG) and a second carrier in a second band of the plurality of bands being grouped in a secondary cell group (SCG).

Example 9 includes a method of any preceding examples 1-8, wherein the UE capability information indicates a plurality of bands of the band combination, and wherein the carrier grouping information indicates that the UE cannot support first carriers from a first subset of the plurality bands being grouped in the cell group for the dual connectivity.

Example 10 includes a method of any preceding examples 1-9, wherein the UE capability information indicates a plurality of bands of the band combination, and wherein the carrier grouping information indicates a UE constraint on grouping first carriers from the plurality of bands in the cell group for the dual connectivity.

Example 11 includes a method of any preceding examples 1-10, wherein the UE capability information indicates a plurality of bands of the band combination, and wherein the carrier grouping information indicates that the UE cannot support a first carrier from a first band of the plurality of bands being grouped in the cell group for the dual connectivity with a second carrier from a second band of the plurality of bands.

Example 12 includes a method of example 11, wherein the carrier grouping information further indicates that the UE can support the first carrier being grouped in the cell group without the second carrier being grouped in the cell group for the dual connectivity.

Example 13 includes a method of any preceding examples 1-12, wherein the UE capability information indicates a plurality of bands of the band combination, and wherein the carrier grouping information indicates a UE requirement to group first carriers from the plurality of bands in the cell group for the dual connectivity.

Example 14 includes a method of any preceding examples 1-13, wherein the UE capability information indicates a plurality of bands of the band combination, and wherein the carrier grouping information indicates that the UE can support a first carrier from a first band of the plurality of bands being grouped in the cell group only when a second carrier from a second band of the plurality of bands is also grouped in the cell group for the dual connectivity.

Example 15 includes a method of any preceding examples 1-14, wherein the UE capability information indicates a plurality of bands of the band combination, and wherein the carrier grouping information indicates a UE constraint on grouping a first carrier from the plurality of bands in the cell group for the dual connectivity, and wherein the carrier grouping information further indicates a UE requirement to group a second carrier from the plurality of bands in the cell group for the dual connectivity.

Example 16 includes a method of any preceding examples 1-15, further comprising: receiving, from a different network node, a different UE capability enquiry associated with the UE's support of the dual connectivity but not the carrier grouping for the dual connectivity, and sending, to the different network node in response to the different UE capability enquiry, different UE capability information indicating the UE's support of the band combination for the dual connectivity and excluding the carrier grouping information.

Example 17 includes a method of any preceding examples 1-16, wherein the UE capability enquiry indicates that the network node supports grouping a plurality of carriers from different frequency ranges in the cell group, and wherein the carrier grouping information indicates that the UE supports the plurality of carriers from the different frequency ranges being grouped in the cell group for the dual connectivity.

Example 18 includes a method of any preceding examples 1-17, wherein the UE capability enquiry indicates that the network node supports a set of band combinations for the dual connectivity, wherein the set includes the band combination, wherein the carrier grouping information indicates that the UE supports a first carrier in a first band from the band combination in a master cell group (MCG) and a second carrier in a second band from the band combination being grouped in a secondary cell group (SCG).

Example 19 includes a method of any preceding examples 1-18, wherein the UE capability enquiry indicates that the network node supports a set of band combinations for a synchronous deployment or an synchronous deployment of the dual connectivity, wherein the set includes the band combination, and wherein the carrier grouping information indicates that the UE cannot support first carriers from the band combination being grouped in the cell group for the synchronous deployment or the synchronous deployment.

Example 20 includes a UE comprising means to perform one or more elements of a method described in or related to any of the examples 1 and 3-19.

Example 21 includes one or more computer-readable media comprising instructions to cause a UE, upon execution of the instructions by one or more processors of the UE, to perform one or more elements of a method described in or related to any of the examples 1 and 3-19.

Example 22 includes a UE comprising logic, modules, or circuitry to perform one or more elements of a method described in or related to any of the examples 1 and 3-19.

Example 23 includes a UE comprising: one or more processors and one or more computer-readable media comprising instructions that, when executed by the one or more processors, cause the one or more processors to perform one or more elements of a method described in or related to any of the examples 1 and 3-19.

Example 24 includes a system comprising means to perform one or more elements of a method described in or related to any of the examples 1 and 3-19.

Example 25 includes a network node comprising means to perform one or more elements of a method described in or related to any of the examples 2-15 and 16-19.

Example 26 includes one or more computer-readable media comprising instructions to cause a network node, upon execution of the instructions by one or more processors of the network node, to perform one or more elements of a method described in or related to any of the examples 2-15 and 16-19.

Example 27 includes a network node comprising logic, modules, or circuitry to perform one or more elements of a method described in or related to any of the examples 2-15 and 16-19

Example 28 includes a network node comprising, one or more processors and one or more computer-readable media comprising instructions that, when executed by the one or more processors, cause the one or more processors to perform one or more elements of a method described in or related to any of the examples 2-15 and 16-19.

Example 29 includes a system comprising means to perform one or more elements of a method described in or related to any of the examples 2-15 and 16-19.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations, and modifications will become apparent to those skilled in the art once the above disclosure is fully appreciated. It is intended that the following claims be interpreted to embrace all such variations and modifications.

What is claimed is:

1. A method comprising:
sending, to a user equipment (UE), a UE capability enquiry including an indication of a carrier grouping for dual connectivity, the carrier grouping including bands usable by a network node;
receiving, from the UE in response to the UE capability enquiry, UE capability information indicating support by the UE of a band combination for the dual connectivity and including carrier grouping information about support by the UE of carriers of the band combination being grouped in a cell group for the dual connectivity, wherein the carrier grouping information is included in the UE capability information upon the indication being included in the UE capability enquiry; and
configuring, for the UE, the cell group for the dual connectivity based on the UE capability information.

2. The method of claim 1, wherein the UE capability enquiry indicates that the network node supports grouping a plurality of carriers from different frequency ranges in a same cell group for the dual connectivity.

3. The method of claim 1, wherein the UE capability enquiry indicates that the network node supports a set of band combinations for the dual connectivity, wherein the set includes the band combination.

4. The method of claim 1, wherein the UE capability enquiry indicates that the network node supports a set of band combinations for a synchronous deployment of the dual connectivity, wherein the set includes the band combination.

5. The method of claim 1, wherein the UE capability enquiry indicates that the network node supports a set of band combinations for an asynchronous deployment of the dual connectivity, wherein the set includes the band combination.

6. A method comprising:
processing a user equipment (UE) capability enquiry received from a network node, the UE capability enquiry including an indication of a carrier grouping for dual connectivity, the carrier grouping including bands usable by the network node;
determining a band combination that a UE supports for the dual connectivity;
determining carrier grouping information about support by the UE of carriers of the band combination being grouped in a cell group; and
causing transmission, to the network node in response to the UE capability enquiry, of UE capability information indicating support by the UE of the band combination for the dual connectivity and including the carrier grouping information for the dual connectivity, wherein the carrier grouping information is included in the UE capability information upon the indication being included in the UE capability enquiry.

7. The method of claim 6, wherein the UE capability information indicates a plurality of bands that form the band combination and that are in different frequency ranges, and wherein the carrier grouping information indicates that the UE supports the bands from the different frequency ranges being grouped in the cell group for the dual connectivity.

8. The method of claim 6, wherein the UE capability information indicates a plurality of bands of the band combination, and wherein the carrier grouping information indicates that the UE supports a first carrier in a first band of the plurality of bands being grouped in a master cell group (MCG) and a second carrier in a second band of the plurality of bands being grouped in a secondary cell group (SCG).

9. The method of claim 6, wherein the UE capability information indicates a plurality of bands of the band combination, and wherein the carrier grouping information indicates that the UE cannot support first carriers from a first subset of the plurality of bands being grouped in the cell group for the dual connectivity.

10. The method of claim 6, wherein the UE capability information indicates a plurality of bands of the band combination, and wherein the carrier grouping information indicates a UE constraint on grouping first carriers from the plurality of bands in the cell group for the dual connectivity.

11. The method of claim 6, wherein the UE capability information indicates a plurality of bands of the band combination, and wherein the carrier grouping information indicates that the UE cannot support a first carrier from a first band of the plurality of bands being grouped in the cell group for the dual connectivity with a second carrier from a second band of the plurality of bands.

12. The method of claim 11, wherein the carrier grouping information further indicates that the UE can support the first carrier being grouped in the cell group without the second carrier being grouped in the cell group for the dual connectivity.

13. The method of claim 6, wherein the UE capability information indicates a plurality of bands of the band combination, and wherein the carrier grouping information indicates a UE requirement to group first carriers from the plurality of bands in the cell group for the dual connectivity.

14. The method of claim 6, wherein the UE capability information indicates a plurality of bands of the band combination, and wherein the carrier grouping information indicates that the UE can support a first carrier from a first band of the plurality of bands being grouped in the cell group only when a second carrier from a second band of the plurality of bands is also grouped in the cell group for the dual connectivity.

15. The method of claim 6, wherein the UE capability information indicates a plurality of bands of the band combination, and wherein the carrier grouping information indicates a UE constraint on grouping a first carrier from the plurality of bands in the cell group for the dual connectivity, and wherein the carrier grouping information further indicates a UE requirement to group a second carrier from the plurality of bands in the cell group for the dual connectivity.

16. The method of claim 6, further comprising:
receiving, from a different network node, a different UE capability enquiry associated with support by the UE of the dual connectivity but not the carrier grouping for the dual connectivity; and
sending, to the different network node in response to the different UE capability enquiry, different UE capability information indicating support by the UE of the band combination for the dual connectivity and excluding the carrier grouping information.

17. A device comprising:
a memory; and
processing circuitry configured to:
process a user equipment (UE) capability enquiry received from a network node, the UE capability enquiry including an indication of a carrier grouping for dual connectivity, the carrier grouping including bands usable by the network node;
determine a band combination that a UE supports for the dual connectivity;

determine carrier grouping information about support by the UE of carriers of the band combination being grouped in a cell group; and cause transmission, to the network node in response to the UE capability enquiry, of UE capability information indicating support by the UE of the band combination for the dual connectivity and including the carrier grouping information for the dual connectivity, wherein the carrier grouping information is included in the UE capability information upon the indication being included in the UE capability enquiry.

18. The device of claim 17, wherein the UE capability enquiry indicates that the network node supports grouping a plurality of carriers from different frequency ranges in the cell group, and wherein the carrier grouping information indicates that the UE supports the plurality of carriers from the different frequency ranges being grouped in the cell group for the dual connectivity.

19. The device of claim 17, wherein the UE capability enquiry indicates that the network node supports a set of band combinations for the dual connectivity, wherein the set includes the band combination, wherein the carrier grouping information indicates that the UE supports a first carrier in a first band from the band combination in a master cell group (MCG) and a second carrier in a second band from the band combination being grouped in a secondary cell group (SCG).

20. The device of claim 17, wherein the UE capability enquiry indicates that the network node supports a set of band combinations for a synchronous deployment or an asynchronous deployment of the dual connectivity, wherein the set includes the band combination, and wherein the carrier grouping information indicates that the UE cannot support first carriers from the band combination being grouped in the cell group for the synchronous deployment or the asynchronous deployment.

* * * * *